US012562039B2

(12) United States Patent
Otera

(10) Patent No.: US 12,562,039 B2
(45) Date of Patent: Feb. 24, 2026

(54) ACTUATOR UNIT, TACTILE SENSE PRESENTATION DEVICE, AND HOUSING MODULE

(71) Applicant: Murata Manufacturing Co., Ltd., Nagaokakyo (JP)

(72) Inventor: Shozo Otera, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 80 days.

(21) Appl. No.: 18/751,787

(22) Filed: Jun. 24, 2024

(65) Prior Publication Data

US 2024/0346895 A1 Oct. 17, 2024

Related U.S. Application Data

(63) Continuation of application No. PCT/JP2022/040308, filed on Oct. 28, 2022.

(30) Foreign Application Priority Data

Dec. 28, 2021 (JP) ................................. 2021-213631

(51) Int. Cl.
$H04B\ 3/36$ (2006.01)
$G01L\ 1/16$ (2006.01)
$G08B\ 6/00$ (2006.01)

(52) U.S. Cl.
CPC ................ *G08B 6/00* (2013.01); *G01L 1/162* (2013.01)

(58) Field of Classification Search
CPC .. G08B 6/00; G01L 1/162; G01L 1/10; B06B 1/06; G06F 3/01; G06F 3/041
See application file for complete search history.

(56) References Cited

U.S. PATENT DOCUMENTS

| | | | |
|---|---|---|---|
| 5,766,137 A | 6/1998 | Omata | |
| 7,446,456 B2 | 11/2008 | Maruyama et al. | |
| 7,554,246 B2 | 6/2009 | Maruyama et al. | |

(Continued)

FOREIGN PATENT DOCUMENTS

| | | |
|---|---|---|
| JP | H09-145691 A | 6/1997 |
| JP | 2006-048302 A | 2/2006 |

(Continued)

OTHER PUBLICATIONS

International Search Report received for PCT Patent Application No. PCT/JP2022/040308, mailed on Dec. 6, 2022, 2 pages (English Translation Only).

*Primary Examiner* — Toan N Pham

(74) *Attorney, Agent, or Firm* — ArentFox Schiff LLP

(57) ABSTRACT

An actuator unit includes an actuator configured to cause a vibration by a vibrated member when a force is applied to the vibrated member and a first sensor configured to generate a first detection signal indicating a first relationship of a first physical quantity varying with time. The first physical quantity is related to the vibration of the vibrated member, a variation cycle of the first physical quantity changes based on a magnitude of the force applied to the vibrated member. The actuator unit also includes a processing circuit configured to process the first detection signal, extract a parameter indicative of the variation cycle of the first physical quantity, and estimate the magnitude of the force applied to the vibrated member based on the parameter.

20 Claims, 19 Drawing Sheets

(56) References Cited

U.S. PATENT DOCUMENTS

| | | | | |
|---|---|---|---|---|
| 10,496,172 | B2 * | 12/2019 | Bisbee | G06F 3/041 |
| 11,251,356 | B2 | 2/2022 | Van Den Ende et al. | |
| 11,481,062 | B1 * | 10/2022 | Wright | G06F 3/0338 |
| 12,141,403 | B2 * | 11/2024 | Tang | G06F 3/044 |
| 2006/0028095 | A1 | 2/2006 | Maruyama et al. | |
| 2006/0238069 | A1 | 10/2006 | Maruyama et al. | |
| 2007/0080608 | A1 | 4/2007 | Maruyama et al. | |
| 2007/0096594 | A1 | 5/2007 | Maruyama et al. | |
| 2016/0291761 | A1 * | 10/2016 | Huie | G06F 3/045 |
| 2018/0242851 | A1 | 8/2018 | Van Den Ende et al. | |
| 2018/0248105 | A1 | 8/2018 | Van Den Ende et al. | |
| 2020/0386631 | A1 | 12/2020 | Wang et al. | |
| 2021/0293648 | A1 * | 9/2021 | Tu | G01L 27/002 |

FOREIGN PATENT DOCUMENTS

| | | | |
|---|---|---|---|
| JP | 4808388 | B2 | 11/2011 |
| JP | 2016-071451 | A | 5/2016 |
| JP | 2018-528070 | A | 9/2018 |

* cited by examiner $$30 \begin{cases} 2 \\ 20 \end{cases}$$

$$40 \begin{cases} 1 \\ 20 \end{cases}$$

$$50 \begin{cases} 1 \\ 30 \end{cases}$$

ACTUATOR UNIT, TACTILE SENSE PRESENTATION DEVICE, AND HOUSING MODULE

CROSS REFERENCE TO RELATED APPLICATIONS

This application is a continuation of International Application No. PCT/JP2022/040308, filed Oct. 28, 2022, which claims priority to Japanese Patent Application No. 2021-213631, filed Dec. 28, 2021, the entire contents of each of which are hereby incorporated by reference in their entirety.

TECHNICAL FIELD

The present disclosure relates to an actuator unit that generates vibration, a tactile sense presentation device, and a housing module.

BACKGROUND

An example electronic device, such as described in Japanese Patent No. 4808388, includes an actuator unit. The electronic device uses a signal generated by contact as an operation signal. The electronic device includes a sensor, an actuator, and a controller. Each of the sensor and the actuator has a sheet shape. The sensor is attached to an inner surface of a housing and detects force applied to the housing by a user. The controller receives a detection signal from the sensor and provides a drive signal to the actuator when the sensor detects contact between the user and the housing. The actuator is attached to the inner surface of the housing and vibrates with the drive signal to vibrate the housing.

Meanwhile, an electronic device, such as the electronic device described in Japanese Patent No. 4808388, may need to calculate the magnitude of the force applied to the vibrated member by the user with high accuracy.

SUMMARY OF THE INVENTION

Therefore, according to an exemplary aspect of the present disclosure an actuator unit, a tactile sense presentation device, and a housing module are provided that are configured to calculate the magnitude of force applied to a vibrated member by a user with high accuracy.

According to some exemplary aspects of the disclosure, an actuator unit according to an aspect of the present disclosure includes an actuator configured to cause a vibration by a vibrated member when a force is applied to the vibrated member and a first sensor configured to generate a first detection signal indicating a first relationship of a first physical quantity varying with time. The first physical quantity is related to the vibration of the vibrated member, a variation cycle of the first physical quantity changes based on a magnitude of the force applied to the vibrated member. The actuator unit also includes a processing circuit configured to process the first detection signal, extract a parameter indicative of the variation cycle of the first physical quantity, and estimate the magnitude of the force applied to the vibrated member based on the parameter.

An actuator unit according to an aspect of the present disclosure is an actuator unit attached to a vibrated member to which a user applies force, the actuator unit including: an actuator that vibrates the vibrated member; a first sensor that acquires a first detection signal indicating a relationship between time and a physical quantity related to vibration of the vibrated member; and a processing circuit to which the first detection signal acquired by the first sensor is input. The first detection signal has a property that a variation cycle of the physical quantity changes when magnitude of the force applied to the vibrated member by the user changes. The processing circuit outputs force data indicating the magnitude of the force applied to the vibrated member by the user on the basis of the first detection signal. The force data changes when the variation cycle of the physical quantity changes.

According to exemplary aspects, X and Y are parts or members of the actuator unit. In the present disclosure, each part of X is defined as follows unless otherwise specified. An upper part of X means the upper half of X. An upper end of X means the end of X in the upward direction. An upper end of X means the upper end of X and the vicinity thereof. It is noted that these definitions also apply to directions other than the upward direction.

Furthermore, the expression "X is located above Y" means that X is located directly above Y. Therefore, as viewed in the up-down direction, X overlaps Y. The expression "X is located over Y" means that X is located directly above Y and that X is located diagonally above Y. Therefore, as viewed in the up-down direction, X may overlap Y or may not overlap Y. This definition also applies to directions other than the upward direction.

In the present disclosure, the expression "X and Y are electrically connected" means that electricity is conducted between X and Y. Therefore, X and Y may be in contact with each other, or X and Y may not be in contact with each other. When X and Y are not in contact with each other, Z having conductivity is disposed between X and Y.

It is noted that, in an actuator unit that is implemented according to the present disclosure, the magnitude of the force applied to the vibrated member by the user can be calculated with high accuracy.

DETAILED DESCRIPTION OF EMBODIMENTS

First Exemplary Embodiment

Figure 1:
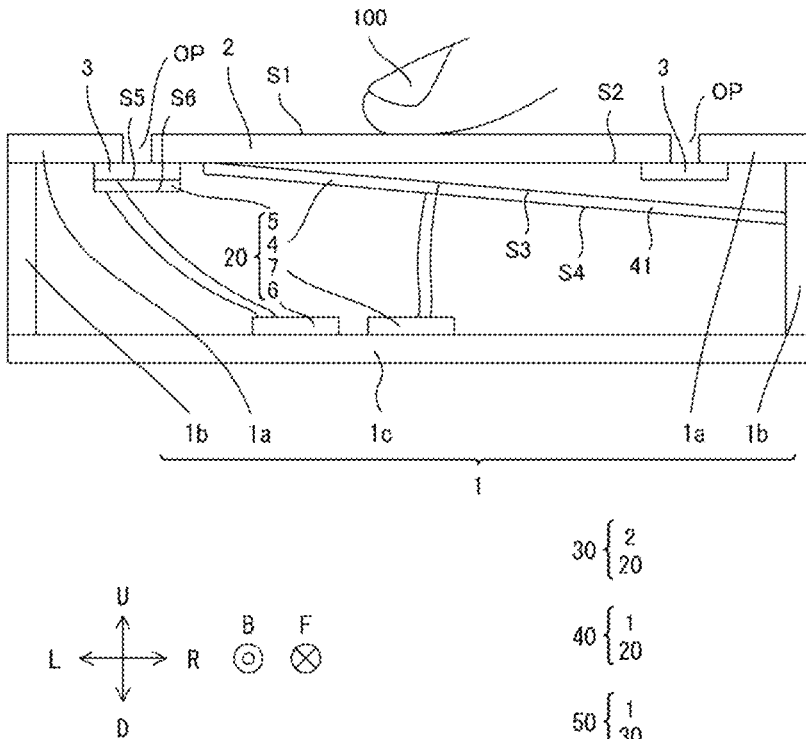
FIG. 1 is a sectional view taken along line A-A of an actuator unit 20 according to a first exemplary embodiment.
Figure 2:
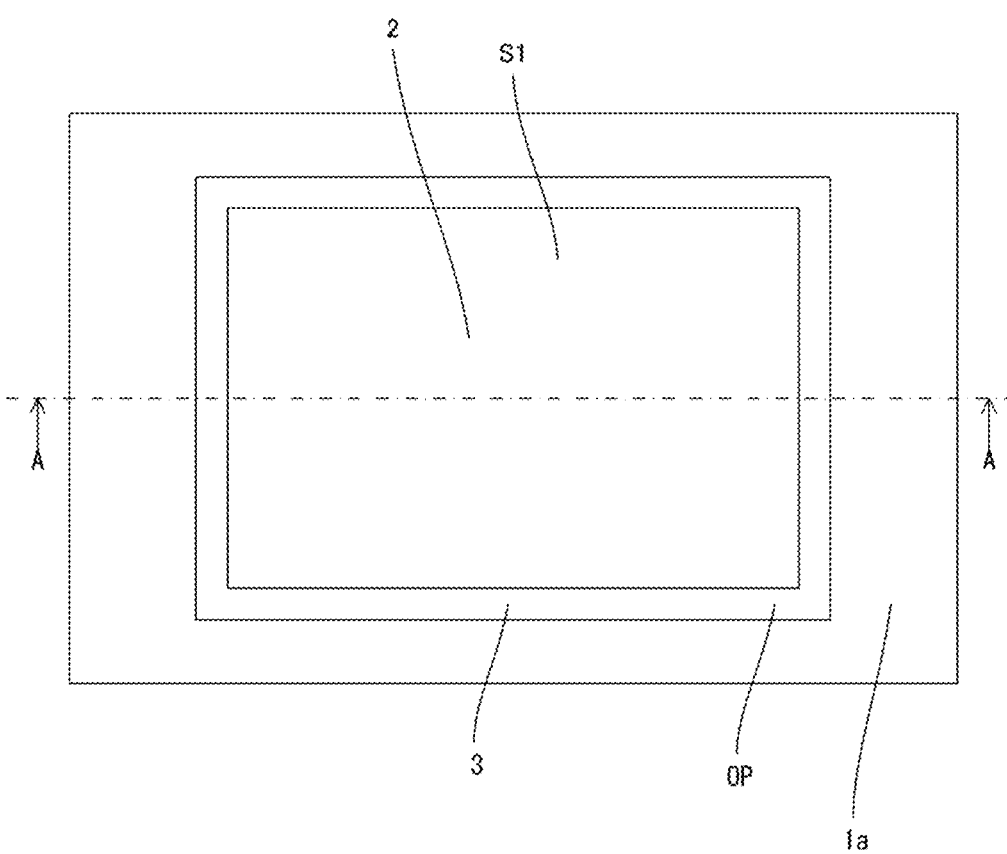
FIG. 2 is a plan view of the actuator unit 20 according to the first exemplary embodiment as viewed downward.
Figure 2:
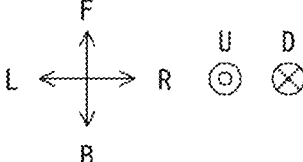
Figure 3:
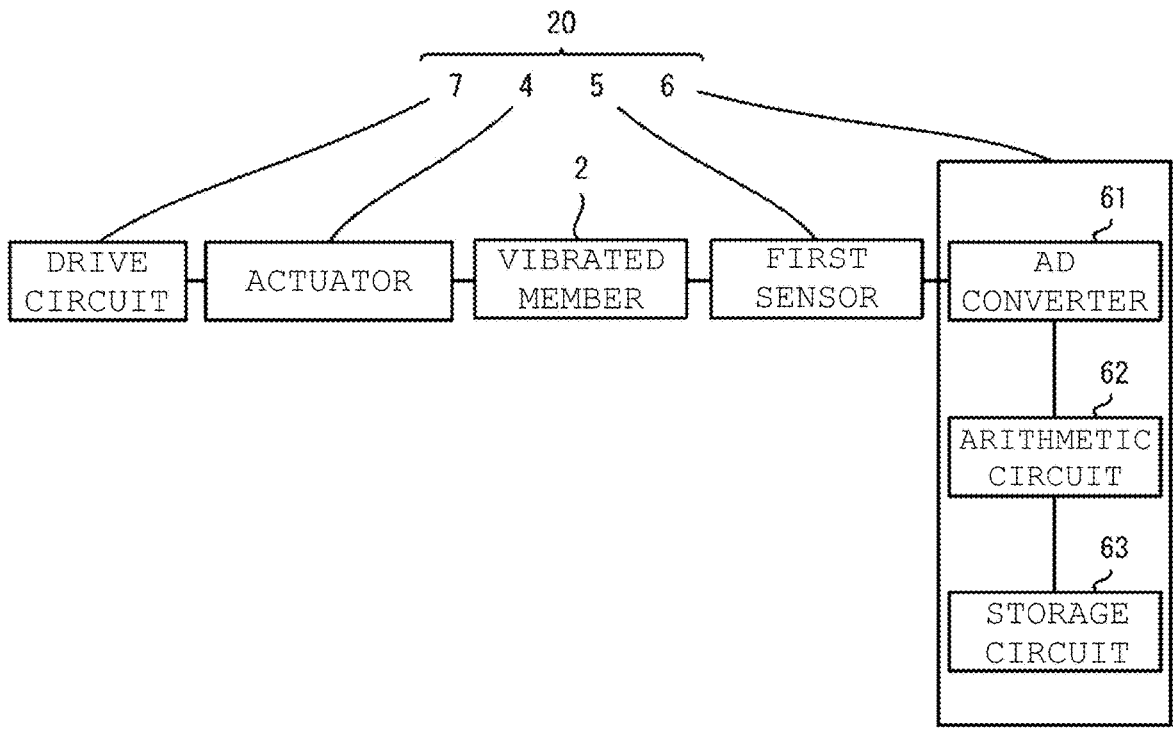
FIG. 3 is a block diagram of the actuator unit 20 according to the first exemplary embodiment.
Figure 4:
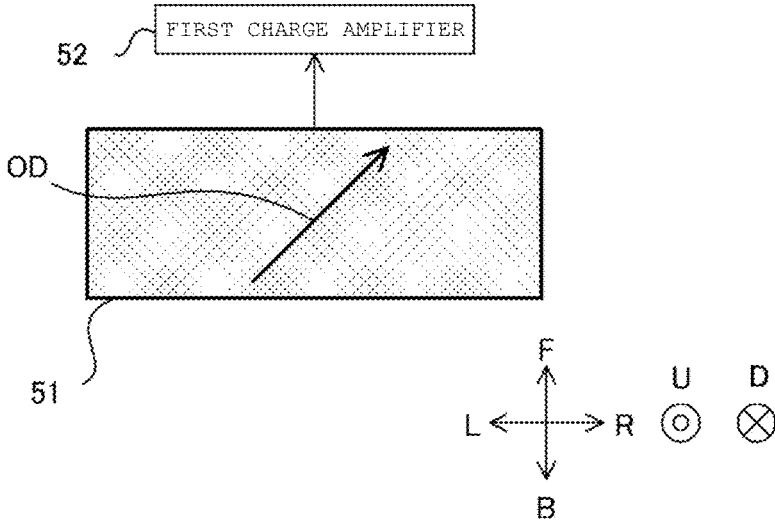
FIG. 4 is a plan view of a first sensor 5 according to the first exemplary embodiment as viewed downward and a sectional view thereof as viewed forward.
Figure 4:
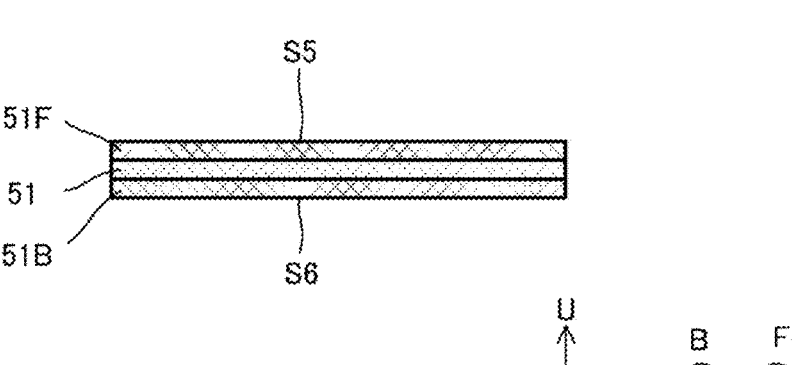
Figure 5:
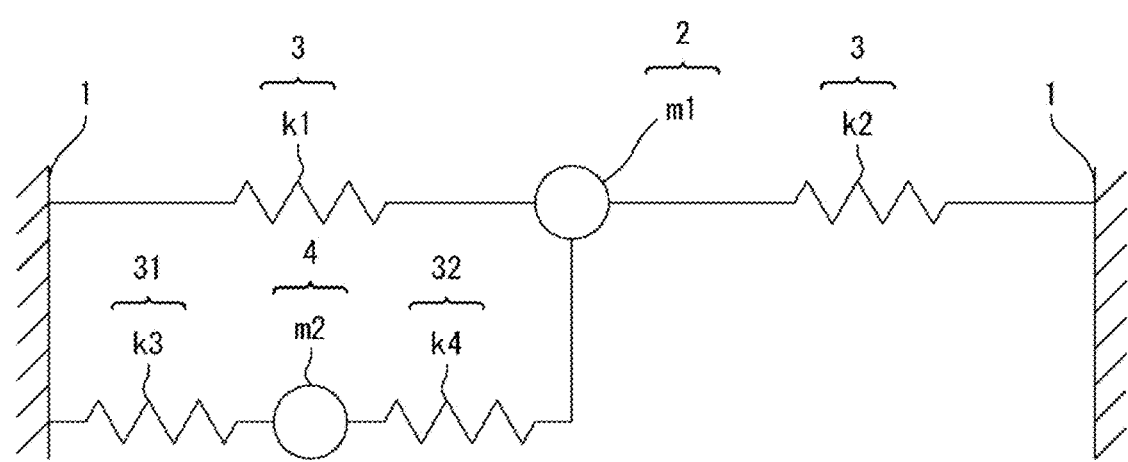
FIG. 5 is an example of a vibration model diagram of a vibrated member 2 according to the first exemplary embodiment.
Figure 6:
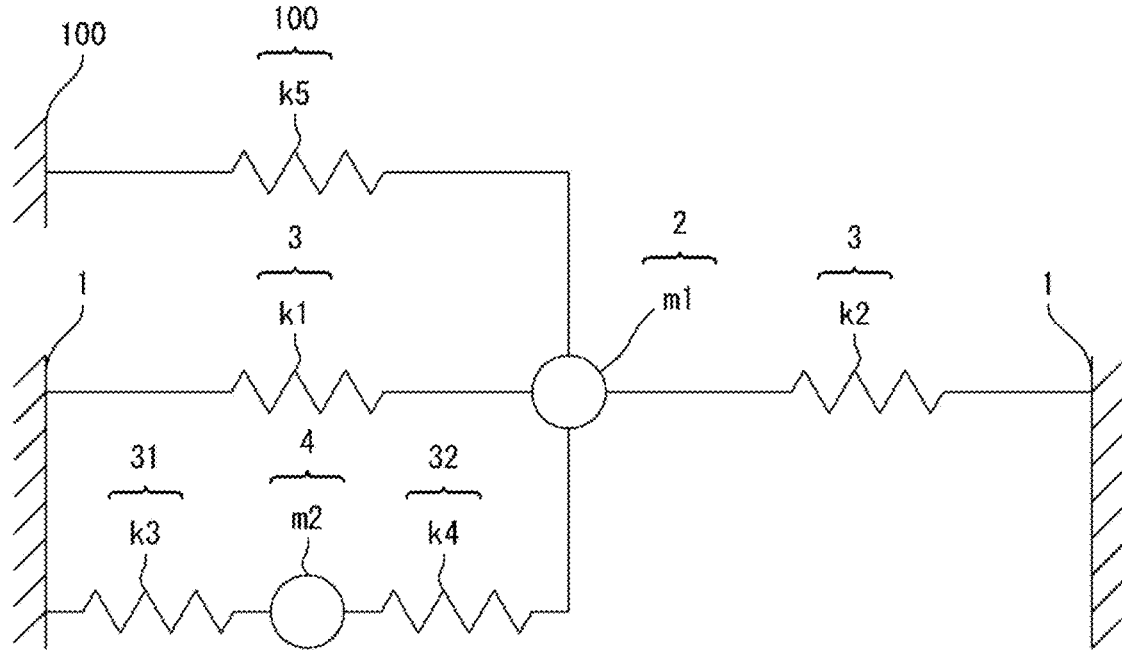
FIG. 6 is an example of the vibration model diagram of the vibrated member 2 according to the first exemplary embodiment.
Figure 7:
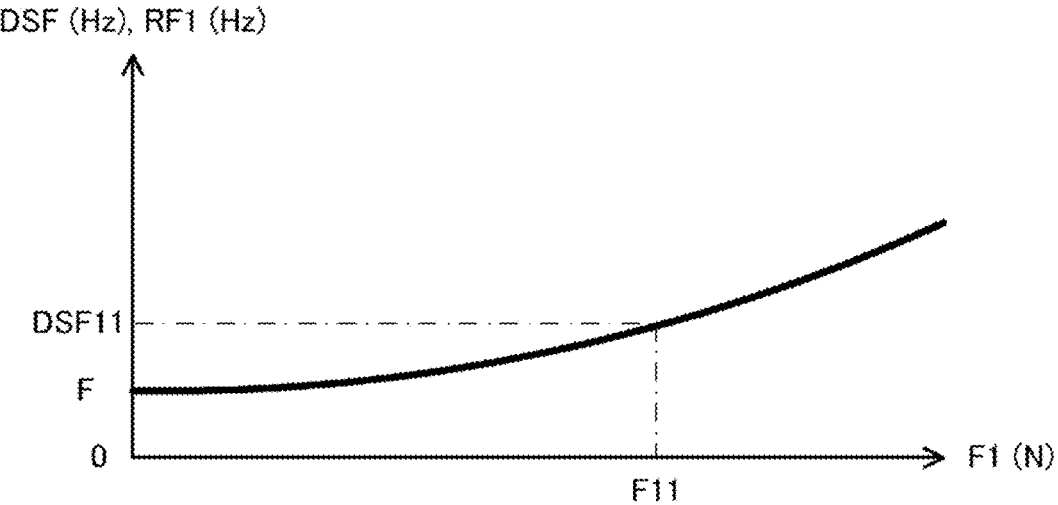
FIG. 7 is an example of a relationship of a resonance frequency RF1 of vibration of a vibrated member 2 and a frequency DSF of a first detection signal SigD1 with a magnitude F1 of force applied to the vibrated member 2 by a user 100 according to the first exemplary embodiment.
Figure 8:
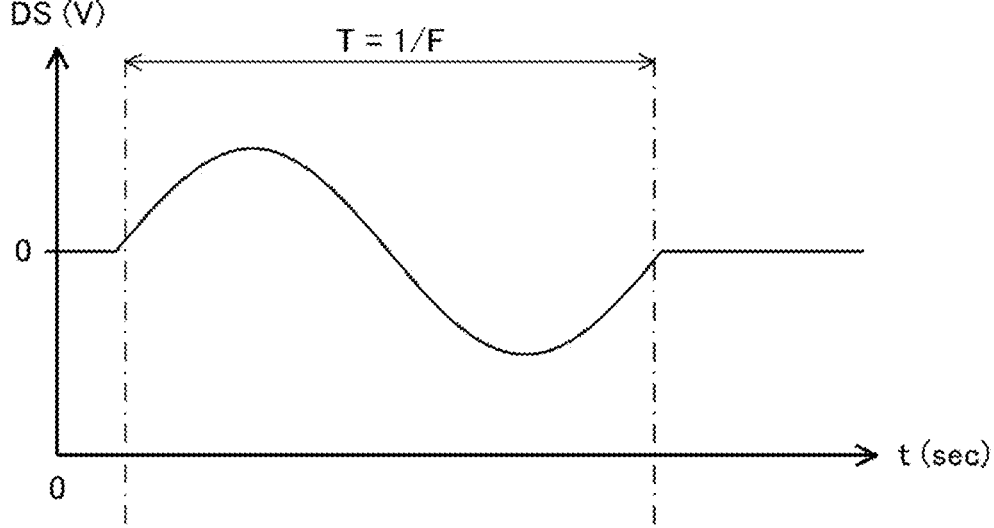
FIG. 8 is an example of a drive signal DS according to the first exemplary embodiment.
Figure 9:
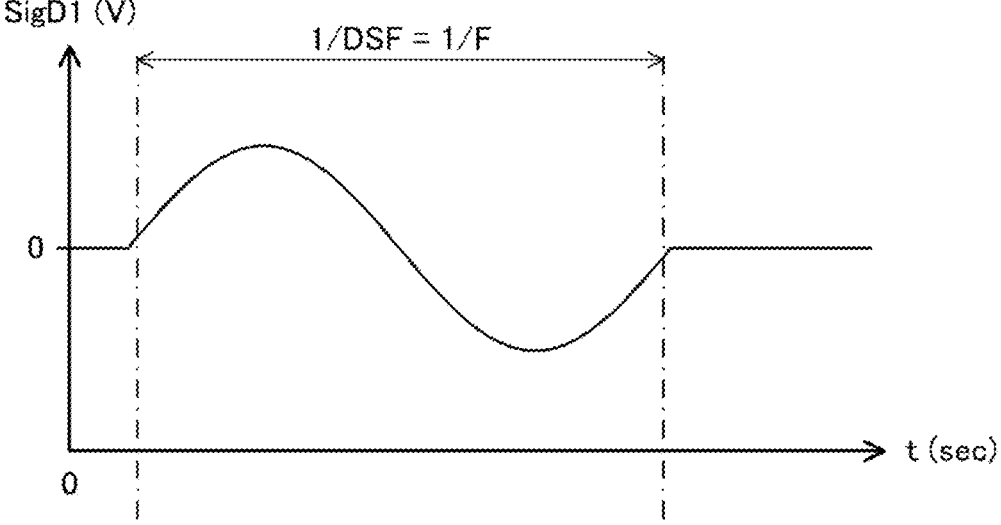
FIG. 9 is an example of a first detection signal SigD1 according to the first exemplary embodiment.
Figure 10:
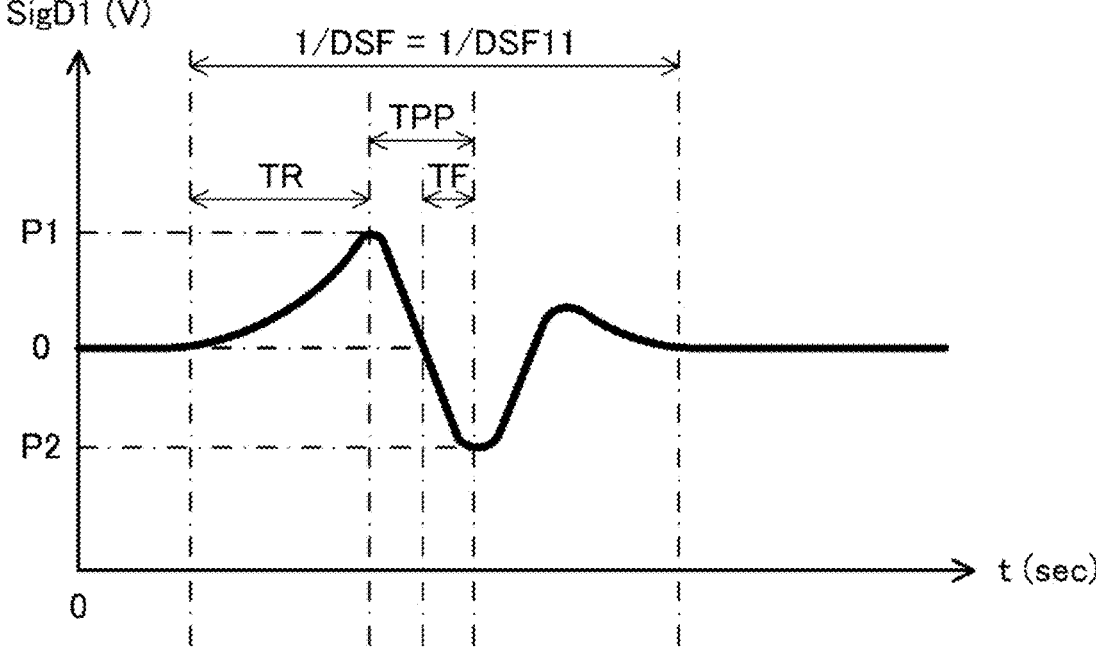
FIG. 10 is an example of the first detection signal SigD1 according to the first exemplary embodiment.

An actuator unit 20 according to a first exemplary embodiment of the present disclosure will be described below with reference to the drawings. FIG. 1 is a sectional view taken along line A-A of the actuator unit 20 according to the first embodiment. FIG. 2 is a plan view of the actuator unit 20 according to the first embodiment as viewed downward. FIG. 3 is a block diagram of the actuator unit 20 according to the first embodiment. FIG. 4 is a plan view of the first sensor 5 according to the first embodiment as viewed downward and a sectional view thereof as viewed forward. FIG. 5 is an example of the vibration model diagram of the vibrated member 2 according to the first embodiment. FIG. 6 is an example of the vibration model diagram of the vibrated member 2 according to the first embodiment. FIG. 7 is an example of a relationship of a resonance frequency RF1 of vibration of a vibrated member 2 and a frequency DSF of a first detection signal SigD1 with a magnitude F1 of force applied to the vibrated member 2 by a user 100 according to the first embodiment. FIG. 8 is an example of the drive signal DS according to the first embodiment. FIG. 9 is an example of the first detection signal SigD1 according to the first embodiment. FIG. 10 is an example of the first detection signal SigD1 according to the first embodiment.

In the present disclosure, directions are defined as follows. The up-down direction is a direction in which the normal of an upper principal surface S1 of the vibrated member 2 extends. The left-right direction is a direction in which the long side of the upper principal surface S1 of the vibrated member 2 extends. The left-right direction is orthogonal to the up-down direction. The front-rear direction is a direction in which the short side of the upper principal surface S1 of the vibrated member 2 extends. The front-rear direction is orthogonal to the up-down direction and the left-right direction. Note that the up-down direction, the left-right direction, and the front-rear direction in the present exemplary embodiment may not coincide with an up-down direction, a left-right direction, or a front-rear direction when the actuator unit 20 is used.

As an example, the actuator unit 20 is used as an actuator unit that gives tactile feedback to the user 100 by vibrating the vibrated member 2 when the user 100 presses the vibrated member 2. Thereby, the vibrated member 2 vibrates when the user 100 presses the vibrated member 2, enabling the user 100 to feel the press of the vibrated member 2.

In the present exemplary embodiment, as an example, as illustrated in FIG. 1, a housing 1 includes a first housing portion 1a, a second housing portion 1b, and a third housing portion 1c. The first housing portion 1a has the upper surface of the housing 1. The third housing portion 1c has the lower surface of the housing 1. The second housing portion 1b is positioned between the first housing portion 1a and the third housing portion 1c as viewed in the front-rear direction.

As illustrated in FIG. 2, the housing 1 is provided with an opening OP. According to an exemplary aspect, the opening OP has a rectangular shape as viewed in the up-down direction. The opening OP has a long side extending in the left-right direction and a short side extending in the front-rear direction. The opening OP penetrates the first housing portion 1a in the up-down direction. As a result, the first housing portion 1a has a rectangular frame shape as illustrated in FIG. 2.

In the present exemplary embodiment, as an example, the vibrated member 2 has a plate shape as illustrated in FIGS. 1 and 2. Hence the vibrated member 2 has an upper principal surface S1 and a lower principal surface S2. The upper principal surface S1 is located above the lower principal surface S2. In the present exemplary embodiment, the upper principal surface S1 and the lower principal surface S2 are parallel. In the present exemplary embodiment, as illustrated in FIG. 2, each of the upper principal surface S1 and the lower principal surface S2 has a rectangular shape as viewed in the up-down direction. Each of the upper principal surface S1 and the lower principal surface S2 has a long side extending in the left-right direction and a short side extending in the front-rear direction.

In the present exemplary embodiment, as illustrated in FIG. 2, the vibrated member 2 is located in the opening OP as viewed in the up-down direction. This enables the user 100 to touch the upper principal surface S1 as illustrated in FIG. 1. That is, the user 100 applies force to the vibrated member 2. In the present exemplary embodiment, the force applied to the vibrated member 2 by the user 100 is the force applied to the upper principal surface S1 by the user 100.

The vibrated member 2 is not in contact with the housing 1. As illustrated in FIGS. 1 and 2, the vibrated member 2 is elastically coupled to the housing 1 via a frame 3. According to an exemplary aspect, the frame 3 is an elastic member. Therefore, the frame 3 is elastically deformed. As illustrated in FIG. 1, the frame 3 elastically couples the lower principal surface S2 of the vibrated member 2 to the lower surface of the first housing portion 1a. This enables the vibrated member 2 to vibrate in an arbitrary direction with respect to the housing 1. The arbitrary direction is, for example, the up-down direction, the left-right direction, the front-rear direction, or other directions.

The vibrated member 2 and the frame 3 block the opening OP of the housing 1. Hence the vibrated member 2, the frame 3, and the housing 1 form a space inside. An actuator unit 20 is provided in this space.

As an example, as illustrated in FIGS. 1 and 3, the actuator unit 20 includes an actuator 4, a first sensor 5, a processing circuit 6, and a drive circuit 7. As illustrated in FIG. 1, the actuator unit 20 is supported by the housing 1.

In the present exemplary embodiment, the actuator 4 includes a first film 41, a first electrode (not illustrated), and a second electrode (not illustrated). The actuator 4 has a film shape.

The first film 41 includes a piezoelectric body. That is, the actuator 4 includes a piezoelectric body. The first film 41 has an upper surface and a lower surface. The first electrode is provided on the upper surface of the first film 41 (not illustrated). The second electrode is provided on the lower surface of the first film 41 (not illustrated). The first electrode and the second electrode are, for example, metal films formed by vapor deposition.

The actuator 4 has a third principal surface S3 and a fourth principal surface S4. The third principal surface S3 is the upper surface of the first electrode. The fourth principal surface S4 is the lower surface of the second electrode. Each of the third principal surface S3 and the fourth principal surface S4 has a rectangular shape as viewed in the up-down direction. Each of the third principal surface S3 and the fourth principal surface S4 has a long side extending in the left-right direction and a short side extending in the front-rear direction. In the present exemplary embodiment, the third principal surface S3 and the fourth principal surface S4 are parallel. The third principal surface S3 is located above the fourth principal surface S4.

When a voltage is applied to the actuator 4, the actuator 4 stretches and contracts along the long side of the actuator 4. According to an exemplary aspect, when a voltage is applied to the first electrode and the second electrode, the first film 41 stretches and contracts along the long side.

In the present exemplary embodiment, when a positive voltage is applied to the actuator 4, the actuator 4 stretches along the long side. On the other hand, when a negative voltage is applied to the actuator 4, the actuator 4 contracts along the long side. In the present exemplary embodiment, the differential value of the displacement of the actuator 4 is proportional to the voltage applied to the actuator 4. Thereby, for example, when an alternating current (AC) voltage is applied to the actuator 4, the actuator 4 stretches and contracts along the long side of the actuator 4. That is, when an AC voltage is applied to the actuator 4, the actuator 4 vibrates along the long side. Note that the AC voltage is a voltage at which the polarity cyclically changes between positive and negative.

As illustrated in FIG. 1, the actuator 4 is elastically coupled to the housing 1 and the vibrated member 2. That is, the actuator unit 20 is attached to the vibrated member 2. According to an exemplary aspect, the left end of the actuator 4 is coupled to the lower principal surface S2 of the vibrated member 2 via, for example, an elastically deformable adhesive 31. The right end of the actuator 4 is elastically coupled to the second housing portion 1b of the housing 1 via, for example, an elastically deformable adhesive 32.

In the present exemplary embodiment, the actuator 4 is fixed to the vibrated member 2 and the second housing portion 1b of the housing 1, while being slightly extended in the left-right direction. The actuator 4 is thus stretched between the second housing portion 1b of the housing 1 and the lower principal surface S2 of the vibrated member 2. The vibrated member 2 is pulled rightward by the actuator 4. As described above, with the actuator 4 attached to the vibrated member 2, tension has been generated in the actuator 4 to cause contraction in the left-right direction.

When an AC voltage is applied to the actuator 4, the actuator 4 vibrates along the long side. At this time, the vibrated member 2 vibrates in the left-right direction because the vibrated member 2 is elastically coupled to the housing 1, and the actuator 4 is attached to the vibrated member 2 so that the vibrated member 2 is pulled rightward by the actuator 4. That is, the actuator 4 vibrates the vibrated member 2. In the present exemplary embodiment, the actuator 4 vibrates the vibrated member 2 in the left-right direction (the direction perpendicular to the normal direction of the upper principal surface S1).

As illustrated in FIG. 4, the first sensor 5 includes a second film 51, a third electrode 51F, a fourth electrode 51B, and a first charge amplifier 52. As illustrated in FIG. 2, the first sensor 5 has a film shape.

As illustrated in FIG. 4, the first sensor 5 has a fifth principal surface S5 and a sixth principal surface S6. Each of the fifth principal surface S5 and the sixth principal surface S6 has a rectangular shape as viewed in the up-down direction. Each of the fifth principal surface S5 and the sixth principal surface S6 has a long side extending in the left-right direction and a short side extending in the front-rear direction. In the present exemplary embodiment, the fifth principal surface S5 and the sixth principal surface S6 are parallel to each other. The fifth principal surface S5 is located above the sixth principal surface S6.

As illustrated in FIG. 4, the second film 51 has an upper surface and a lower surface. In the present exemplary embodiment, the second film 51 includes a piezoelectric body. That is, the first sensor 5 includes a piezoelectric body. The second film 51 is a piezoelectric film. According to an exemplary aspect, in the present exemplary embodiment, the second film 51 is a poly-L-lactic acid (PLLA) film.

The second film 51 generates charges corresponding to the differential value of the displacement of the second film 51. The polarity of the charge generated when the second film 51 is stretched in the left-right direction is opposite to the polarity of the charge generated when the second film 51 is stretched in the front-rear direction. Specifically, the second film 51 is a film formed of a chiral polymer. The chiral polymer is, for example, polylactic acid (PLA), particularly poly-L-lactic acid (PLLA). PLLA, which is a chiral polymer, has a main chain with a helical structure. PLLA has piezoelectricity in which molecules are oriented when uniaxial stretching is performed. The second film 51 has a piezoelectric constant of d14.

In the present exemplary embodiment, a uniaxial stretching axis OD of the second film 51 forms an angle of 45 degrees counterclockwise with respect to the left-right direction and forms an angle of 45 degrees clockwise with respect to the front-rear direction. That is, the second film 51 is stretched at least in a uniaxial direction. This angle of 45 degrees includes, for example, angles ranging from 45 degrees plus 10 degrees to 45 degrees minus 10 degrees. As a result, the second film 51 is deformed to be stretched in the left-right direction or deformed to be compressed in the left-right direction, thereby generating charges. For example, when the second film 51 is deformed to be stretched in the left-right direction, positive charges are generated. For example, when the second film 51 is deformed to be compressed in the left-right direction, negative charges are generated. The magnitude of the generated charge depends on the differential value of the displacement of the second film 51 due to expansion or compression.

The third electrode 51F is a signal electrode. As illustrated in FIG. 4, the third electrode 51F is provided on the upper surface of the second film 51. The third electrode 51F covers the upper surface of the second film 51. That is, the fifth principal surface S5 is the upper surface of the third electrode 51F. The third electrode 51F is, for example, a metal film formed by vapor deposition.

The fourth electrode 51B is a ground electrode. The fourth electrode 51B is connected to a ground potential. As illustrated in FIG. 4, the fourth electrode 51B is provided on the lower surface of the second film 51. The fourth electrode 51B covers the lower surface of the second film 51. That is, the sixth principal surface S6 is the lower surface of the fourth electrode 51B. The fourth electrode 51B is, for example, a metal film formed by vapor deposition.

The first charge amplifier 52 converts the charge generated by the second film 51 into a first detection signal SigD1 that is a voltage signal. After the conversion, the first charge amplifier 52 outputs the first detection signal SigD1 to the processing circuit 6.

As illustrated in FIG. 1, the first sensor 5 is attached to the frame 3. According to an exemplary aspect, the fifth principal surface S5 of the first sensor 5 is attached to the lower surface of the frame 3 via, for example, an insulating adhesive (not illustrated). As a result, in the present exemplary embodiment, the first sensor 5 acquires the first detection signal SigD1 indicating the relationship between the differential value of the displacement of the vibrated member 2 and the time. That is, as illustrated in FIG. 3, the first sensor 5 acquires the first detection signal SigD1 indicating the relationship between the physical quantity related to the vibration of the vibrated member 2 and the time. In the present exemplary embodiment, the physical quantity related to the vibration of the vibrated member 2 is the differential value of the displacement of the vibrated member 2. The first detection signal SigD1 has a property that a variation cycle of a physical quantity related to the vibration of the vibrated member 2 changes when the magnitude F1 of the force applied to the vibrated member 2 by the user 100 changes. In the present exemplary embodiment, the variation cycle of the physical quantity related to the vibration of the vibrated member 2 is the reciprocal of the frequency of the vibration of the vibrated member 2. Details will be described below.

The vibrated member 2 is elastically coupled to the housing 1 via the frame 3. The actuator 4 is elastically coupled to the vibrated member 2 via the adhesive 31. The actuator 4 is elastically coupled to the housing 1 via an adhesive 32. Therefore, the vibration of the vibrated member 2 is a two-degree-of-freedom vibration system as illustrated in FIG. 5. Here, the mass of the vibrated member 2 is m1, the elastic coefficient of the left part of the frame 3 is k1, the elastic coefficient of the right part of the frame 3 is k2, the mass of the actuator 4 is m2, the elastic coefficient of the adhesive 31 is k3, and the elastic coefficient of the adhesive 32 is k4. In this case, the vibration of the vibrated member 2 has at least one resonance frequency RF1. The resonance frequency RF1 of the vibration of the vibrated member 2 depends on the mass m1 of the vibrated member 2, the mass m2 of the actuator 4, the elastic coefficient k1 of the left part of the frame 3, the elastic coefficient k2 of the right part of the frame 3, the elastic coefficient k3 of the adhesive 31, and the elastic coefficient k4 of the adhesive 32.

When the user 100 applies force to the vibrated member 2, the resonance frequency RF1 of the vibration of the vibrated member 2 changes. According to an exemplary aspect, when the user 100 applies force to the vibrated member 2, the user 100 is added to the vibration system of the vibrated member 2 as illustrated in FIG. 6. Here, the elastic coefficient of the user 100 is k5. That is, when the user 100 applies force to the vibrated member 2, a part of the body of the user 100 (in the example of FIG. 1, a finger) contacts the upper principal surface S1 of the vibrated member 2 as illustrated in FIG. 1. Alternatively, a part of the body of the user 100 applies force to the upper principal surface S1 of the vibrated member 2 via an operation member. As a result, the part of the body of the user 100 (in the example of FIG. 1, the skin) is elastically deformed. In this case, the resonance frequency RF1 of the vibration of the vibrated member 2 depends on the mass m1 of the vibrated member 2, the mass m2 of the actuator 4, the elastic coefficient k1 of the left part of the frame 3, the elastic coefficient k2 of the right part of the frame 3, the elastic coefficient k3 of the adhesive 31, the elastic coefficient k4 of the adhesive 32, and the elastic coefficient k5 of the user 100. Therefore, when the user 100 applies force to the vibrated member 2, the resonance frequency RF1 of the vibration of the vibrated member 2 changes.

The elastic coefficient k5 of the user 100 increases as the magnitude of the force applied to the vibrated member 2 by the user 100 increases. According to an exemplary aspect, the deformation amount of the finger of the user 100 increases as the magnitude of the force applied to the vibrated member 2 by the user 100 increases. On the other hand, since the skin of the user 100 is compressed more as the deformation amount of the finger of the user 100 increases, a change in the deformation amount of the finger of the user 100 with respect to a change in the magnitude of the force applied to the vibrated member 2 by the user 100 decreases. Therefore, the elastic coefficient k5 of the user 100 increases as the magnitude of the force applied to the vibrated member 2 by the user 100 increases. As a result, as illustrated in FIG. 7, the resonance frequency RF1 of the vibration of the vibrated member 2 increases as the magnitude of the force applied to the vibrated member 2 by the user 100 increases.

As illustrated in FIG. 3, the processing circuit 6 includes an AD converter 61, an arithmetic circuit 62, and a storage circuit 63. As illustrated in FIG. 1, the processing circuit 6 is provided on the upper surface of the third housing portion 1c. The processing circuit 6 is electrically connected to the first sensor 5. According to an exemplary aspect, the AD converter 61 is electrically connected to the first charge amplifier 52. Thereby, the first detection signal SigD1 output from the first charge amplifier 52 is input to the AD converter 61 as illustrated in FIG. 3. That is, the first detection signal SigD1 acquired by the first sensor 5 is input to the processing circuit 6.

The AD converter 61 performs AD conversion on the first detection signal SigD1. The AD converter 61 thus converts the first detection signal SigD1 into a digital signal. Specifically, the AD converter 61 converts the first detection signal SigD1 according to the resolution of the AD converter 61.

The AD converter 61 also acquires a reference voltage. The AD converter 61 sets a first reference value of the first detection signal SigD1 on the basis of the reference voltage. Then, as illustrated in FIG. 3, the AD converter 61 outputs the first detection signal SigD1 to the arithmetic circuit 62.

The processing circuit 6 extracts a parameter depending on the variation cycle of the physical quantity related to the vibration of the vibrated member 2 on the basis of the first detection signal SigD1. In the present exemplary embodiment, the parameter depending on the variation cycle of the physical quantity related to the vibration of the vibrated member 2 is the frequency DSF of the first detection signal SigD1. That is, in the present exemplary embodiment, the parameter depending on the variation cycle of the physical quantity related to the vibration of the vibrated member 2 has a unit for frequency. The unit for frequency is Hz.

Specifically, the storage circuit 63 stores a program for a process to extract the parameter depending on the variation cycle of the physical quantity related to the vibration of the vibrated member 2 on the basis of the first detection signal SigD1. The storage circuit 63 includes, for example, a read-only memory (ROM) and a random-access memory (RAM). The arithmetic circuit 62 reads the program stored in the ROM to the RAM. Thereby, the arithmetic circuit 62 performs the process to extract the parameter depending on the variation cycle of the physical quantity related to the vibration of the vibrated member 2 on the basis of the first detection signal SigD1. Such an arithmetic circuit 62 is, for example, a central processing unit (CPU).

As illustrated in FIG. 7, the storage circuit 63 stores the relationship between the frequency DSF of the first detection signal SigD1 and the magnitude F1 of the force applied to the vibrated member 2 by the user 100. The arithmetic circuit 62 thus estimates the magnitude F1 of the force applied to the vibrated member 2 by the user 100 on the basis of the frequency DSF of the first detection signal SigD1. That is, the processing circuit 6 estimates the magnitude F1 of the force applied to the vibrated member 2 by the user 100 on the basis of the parameter depending on the variation cycle of the physical quantity related to the vibration of the vibrated member 2. The arithmetic circuit 62 outputs force data indicating the magnitude F1 of the estimated force applied to the vibrated member 2 by the user 100. That is, the processing circuit 6 outputs force data indicating the magnitude F1 of the force applied to the vibrated member 2 by the user 100 on the basis of the first detection signal SigD1.

As illustrated in FIG. 1, the drive circuit 7 is provided on the upper surface of the third housing portion 1c. The drive circuit 7 is electrically connected to the actuator 4. According to an exemplary aspect, the drive circuit 7 is electrically connected to the first electrode and the second electrode of the actuator 4. Thereby, the drive signal DS output from the drive circuit 7 is input to the first electrode and the second electrode. That is, the drive circuit 7 applies the drive signal DS to the actuator 4. This causes the actuator 4 to vibrate the vibrated member 2 on the basis of the drive signal DS.

The operation of the actuator unit 20 will be described below with reference to FIGS. 8 to 10.

First, the operation of the drive circuit 7 will be described with reference to FIG. 8. In the present exemplary embodiment, as an example, the drive signal DS is a burst wave as illustrated in FIG. 8. In the present exemplary embodiment, the number of cycles of the burst wave is 1. The burst wave is a sine wave. As illustrated in FIG. 8, the drive signal DS has a unit V (volt) for voltage. The frequency of the drive signal DS is F (Hz). The cycle of the drive signal DS is T (sec). The drive circuit 7 applies the drive signal DS to the actuator 4.

Next, the operation of the actuator 4 will be described. The actuator 4 vibrates the vibrated member 2 on the basis of the drive signal DS. According to an exemplary aspect, the actuator 4 vibrates the vibrated member 2 in the left-right direction. In the present exemplary embodiment, the differential value of the displacement of the actuator 4 is proportional to the voltage applied to the actuator 4. That is, the differential value of the displacement of the actuator 4 is proportional to the drive signal DS.

Next, the operation of the first sensor 5 will be described. As illustrated in FIG. 9, the first sensor 5 acquires the first detection signal SigD1 indicating the relationship between the differential value of the displacement of the vibrated member 2 and the time. In the example of FIG. 9, the user 100 is not applying force to the vibrated member 2.

Next, the operation of the processing circuit 6 will be described. The first detection signal SigD1 acquired by the first sensor 5 is input to the processing circuit 6. As illustrated in FIG. 9, the first detection signal SigD1 has the frequency DSF. The processing circuit 6 extracts the frequency DSF of the first detection signal SigD1 on the basis of the first detection signal SigD1. The frequency DSF of the first detection signal SigD1 has a unit Hz for frequency.

Next, the processing circuit 6 estimates the magnitude F1 of the force applied to the vibrated member 2 by the user 100 on the basis of the frequency DSF of the first detection signal SigD1. According to an exemplary aspect, as illustrated in FIG. 7, the arithmetic circuit 62 estimates the magnitude F1 of the force applied to the vibrated member 2 by the user 100 on the basis of the frequency DSF of the first detection signal SigD1 and the relationship between the frequency DSF of the first detection signal SigD1 and the magnitude F1 of the force applied to the vibrated member 2 by the user 100, stored in the storage circuit 63. Specifically, since the frequency DSF of the first detection signal SigD1 is F, the arithmetic circuit 62 estimates the magnitude F1 of the force applied to the vibrated member 2 by the user 100 as 0 as illustrated in FIG. 7.

Next, the processing circuit 6 outputs force data indicating the magnitude F1 of the force applied to the vibrated member 2 by the user 100. Specifically, the arithmetic circuit 62 outputs force data indicating that the magnitude F1 of the force applied to the vibrated member 2 by the user 100 is 0.

Next, it is assumed that the user 100 applies force to the vibrated member 2. The frequency DSF of the first detection signal SigD1 changes due to the change in the magnitude F1 of the force applied to the vibrated member 2 by the user 100. According to an exemplary aspect, the resonance frequency RF1 of the vibration of the vibrated member 2 changes due to the change in the magnitude F1 of the force applied to the vibrated member 2 by the user 100. Thereby, the frequency DSF of the first detection signal SigD1 changes. Specifically, the first detection signal SigD1 changes as illustrated in FIG. 10.

The processing circuit 6 extracts the frequency DSF of the first detection signal SigD1 on the basis of the first detection signal SigD1 that has changed. Specifically, the frequency DSF of the first detection signal SigD1 is DSF11 as illustrated in FIG. 10.

Next, the processing circuit 6 estimates the magnitude F1 of the force applied to the vibrated member 2 by the user 100 on the basis of the frequency DSF of the first detection signal SigD1. Specifically, since the frequency DSF of the first detection signal SigD1 is DSF11, the arithmetic circuit 62 estimates the magnitude F1 of the force applied to the vibrated member 2 by the user 100 as F11 as illustrated in FIG. 7.

Next, the processing circuit 6 outputs force data indicating the magnitude F1 of the force applied to the vibrated member 2 by the user 100. Specifically, the arithmetic circuit 62 outputs force data indicating that the magnitude F1 of the force applied to the vibrated member 2 by the user 100 is F11. That is, the force data changes when the variation cycle of the physical quantity related to the vibration of the vibrated member 2 changes.

Specifically, as illustrated in FIG. 7, the magnitude F1 of the force applied to the vibrated member 2 by the user 100 increases as the frequency DSF of the first detection signal SigD1 increases. That is, the force data increases as the variation cycle of the physical quantity related to the vibration of the vibrated member 2 decreases.

Effects

According to the actuator unit 20, the magnitude F1 of the force applied to the vibrated member 2 by the user 100 can be calculated with high accuracy. According to an exemplary aspect, the first sensor 5 acquires the first detection signal SigD1 indicating the relationship between the physical quantity related to the vibration of the vibrated member 2 and the time. The first detection signal SigD1 acquired by the first sensor 5 is input to the processing circuit 6. The processing circuit 6 extracts the parameter depending on the variation cycle of the physical quantity related to the vibration of the vibrated member 2 on the basis of the first detection signal SigD1. The first detection signal SigD1 has a property that a variation cycle of a physical quantity related to the vibration of the vibrated member 2 changes when the magnitude F1 of the force applied to the vibrated member 2 by the user 100 changes. According to an exemplary aspect, the resonance frequency RF1 of the vibration of the vibrated member 2 changes due to the change in the magnitude F1 of the force applied to the vibrated member 2 by the user 100. The processing circuit 6 thus estimates the magnitude F1 of the force applied to the vibrated member 2 by the user 100 on the basis of the extracted parameter depending on the variation cycle of the physical quantity related to the vibration of the vibrated member 2. Then, the processing circuit 6 outputs force data indicating the magnitude F1 of the force applied to the vibrated member 2 by the user 100. As a result, according to the actuator unit 20, the magnitude F1 of the force applied to the vibrated member 2 by the user 100 can be calculated with high accuracy.

According to the actuator unit 20, the magnitude F1 of the force applied to the vibrated member 2 by the user 100 can be calculated with higher accuracy than when the magnitude F1 of the force applied to the vibrated member 2 by the user 100 is detected by a capacitive sensor. According to an exemplary aspect, when the magnitude F1 of the force applied to the vibrated member 2 by the user 100 is detected by the capacitive sensor, a change in capacitance value between two electrodes included in the capacitive sensor is detected. The capacitance value between the two electrodes depends on the magnitude of lines of electric force between the two electrodes. The magnitude of the lines of electric force changes when a part of the body of the user 100 approaches the vibrated member 2. The capacitive sensor detects the magnitude F1 of the force applied to the vibrated member 2 by the user 100 by detecting the change in the magnitude of the lines of electric force. On the other hand, after the part of the body of the user 100 contacts the vibrated member 2, the change in capacitance value between the two electrodes, due to the change in the magnitude F1 of the force applied to the vibrated member 2 by the user 100, decreases. As a result, when the magnitude F1 of the force applied to the vibrated member 2 by the user 100 is detected by the capacitive sensor, the detection accuracy in the magnitude F1 of the force applied to the vibrated member 2 by the user 100 decreases. On the other hand, according to the actuator unit 20, such a decrease in the calculation accuracy in the magnitude F1 of the force applied to the vibrated member 2 by the user 100 does not occur. As a result, according to the actuator unit 20, the magnitude F1 of the force applied to the vibrated member 2 by the user 100 can be calculated with higher accuracy than when the magnitude F1 of the force applied to the vibrated member 2 by the user 100 is detected by the capacitive sensor.

According to the actuator unit 20, the magnitude F1 of the force applied to the vibrated member 2 by the user 100 can be easily calculated. According to an exemplary aspect, the parameter depending on the variation cycle of the physical quantity related to the vibration of the vibrated member 2 has a unit for frequency. The processing circuit 6 can estimate the magnitude F1 of the force applied to the vibrated member 2 by the user 100, for example, without requiring a parameter having a unit for length or a parameter having a unit for mass. As a result, according to the actuator unit 20, the magnitude F1 of the force applied to the vibrated member 2 by the user 100 can be easily calculated.

According to the actuator unit 20, the magnitude F1 of the force applied to the vibrated member 2 by the user 100 can be calculated with high accuracy in a short calculation time. According to an exemplary aspect, the parameter depending on the variation cycle of the physical quantity related to the vibration of the vibrated member 2 is the frequency DSF of the first detection signal SigD1. This enables the processing circuit 6 to estimate the magnitude F1 of the force applied to the vibrated member 2 by the user 100 within one cycle of the change in the physical quantity related to the vibration of the vibrated member 2. As a result, according to the actuator unit 20, the magnitude F1 of the force applied to the vibrated member 2 by the user 100 can be calculated with high accuracy in a short calculation time.

According to the actuator unit 20, the magnitude F1 of the force applied to the vibrated member 2 by the user 100 can be calculated with high accuracy in a short calculation time. According to an exemplary aspect, the actuator 4 vibrates the vibrated member 2 on the basis of the drive signal DS. The drive signal DS includes a burst wave. This enables the processing circuit 6 to estimate the magnitude F1 of the force applied to the vibrated member 2 by the user 100 within a period when the burst wave is being applied to the actuator 4. As a result, according to the actuator unit 20, the magnitude F1 of the force applied to the vibrated member 2 by the user 100 can be calculated with high accuracy in a short calculation time.

According to the actuator unit 20, in a state where the user 100 is applying force to the vibrated member 2, the magnitude F1 of the force applied by the user 100 to the vibrated member 2 can be calculated with high accuracy. According to an exemplary aspect, the vibrated member 2 has the upper principal surface S1. The user 100 applies force to the upper principal surface S1. The actuator 4 vibrates the vibrated member 2 in the left-right direction (the direction perpendicular to the normal direction of the upper principal surface S1). As a result, according to the actuator unit 20, in the state where the user 100 is applying force to the vibrated member 2, the magnitude F1 of the force applied to the vibrated member 2 by the user 100 can be calculated with high accuracy.

According to the actuator unit 20, after the deformation of the first sensor 5, the magnitude F1 of the force applied to the vibrated member 2 by the user 100 can be calculated with high accuracy. According to an exemplary aspect, the first sensor 5 includes a piezoelectric body. The second film 51 generates charges corresponding to the differential value of the displacement of the second film 51. As a result, the value of the first detection signal SigD1 after the deformation of the first sensor 5 and at the time when no additional deformation has occurred in the first sensor 5 is equal to the value of the first detection signal SigD1 before the deformation of the first sensor 5 and at the time when no additional deformation has occurred in the first sensor 5. That is, in a state where the first sensor 5 is deformed, the first sensor 5 can acquire the first detection signal SigD1 indicating the relationship between the physical quantity related to the vibration of the vibrated member 2 and the time as in the case before the deformation of the first sensor 5. Therefore, after the deformation of the first sensor 5, the processing circuit 6 can extract the parameter depending on the variation cycle of the physical quantity related to the vibration of the vibrated member 2 on the basis of the first detection signal SigD1. Furthermore, the processing circuit 6 can estimate the magnitude F1 of the force applied to the vibrated member 2 by the user 100 on the basis of the extracted parameter depending on the variation cycle of the physical quantity related to the vibration of the vibrated member 2. Then, the processing circuit 6 can output force data indicating the magnitude F1 of the force applied to the vibrated member 2 by the user 100. As a result, according to the actuator unit 20, after the deformation of the first sensor 5, the magnitude F1 of the force applied to the vibrated member 2 by the user 100 can be calculated with high accuracy.

According to the actuator unit 20, the magnitude F1 of the force applied to the vibrated member 2 by the user 100 can be calculated with high accuracy. According to an exemplary aspect, the first detection signal SigD1 has a property that the variation cycle of the physical quantity related to the vibration of the vibrated member 2 changes when the magnitude F1 of the force applied to the vibrated member 2 by the user 100 changes. The processing circuit 6 outputs force data indicating the magnitude F1 of the force applied to the vibrated member 2 by the user 100 on the basis of the first detection signal SigD1. The force data changes when the variation cycle of the physical quantity related to the vibration of the vibrated member 2 changes. As a result, according to the actuator unit 20, the magnitude F1 of the force applied to the vibrated member 2 by the user 100 can be calculated with high accuracy.

According to the actuator unit 20, the magnitude F1 of the force applied to the vibrated member 2 by the user 100 can be uniquely calculated with high accuracy. According to an exemplary aspect, the force data increases as the variation cycle of the physical quantity related to the vibration of the vibrated member 2 decreases. Therefore, the processing circuit 6 can determine the magnitude F1 of the force applied to the vibrated member 2 by the user 100 on the basis of the variation cycle of the physical quantity related to the vibration of the vibrated member 2. As a result, according to the actuator unit 20, the magnitude F1 of the force applied to the vibrated member 2 by the user 100 can be uniquely calculated with high accuracy.

Second Exemplary Embodiment

Figure 11:
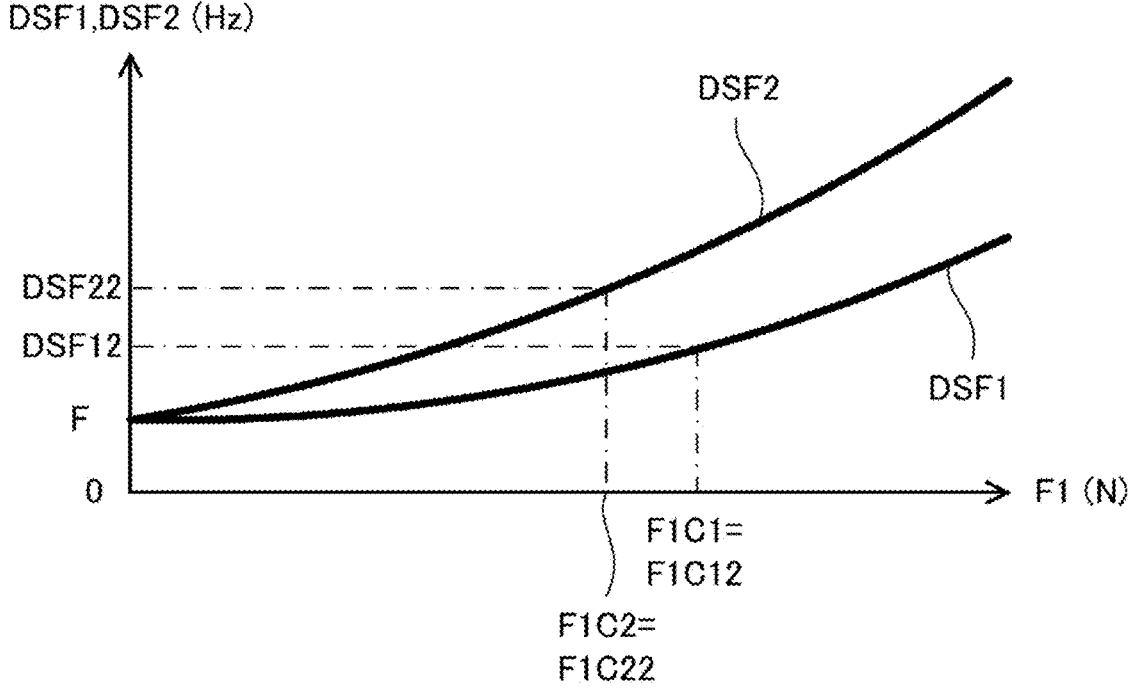
FIG. 11 is an example of relationships of both a first frequency DSF1 and a second frequency DSF2 with the magnitude F1 of the force applied to the vibrated member 2 by the user 100 according to a second exemplary embodiment.
Figure 12:
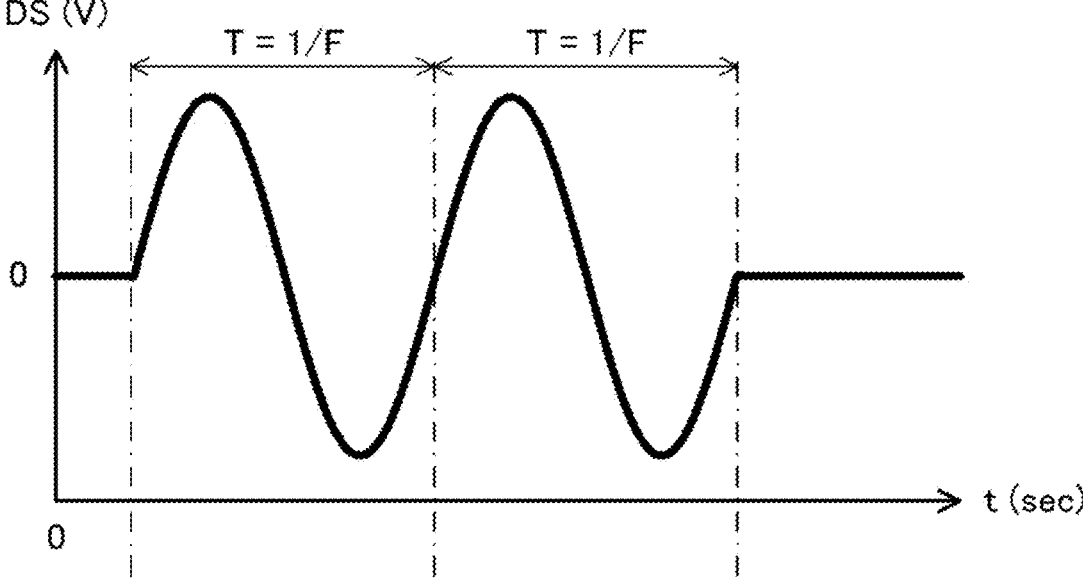
FIG. 12 is an example of the drive signal DS according to the second exemplary embodiment.
Figure 13:
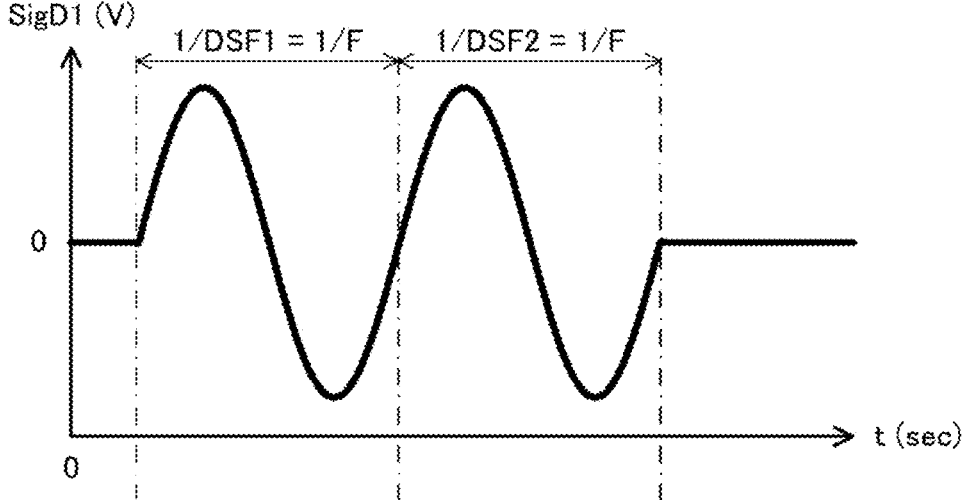
FIG. 13 is an example of the first detection signal SigD1 according to the second exemplary embodiment.
Figure 14:
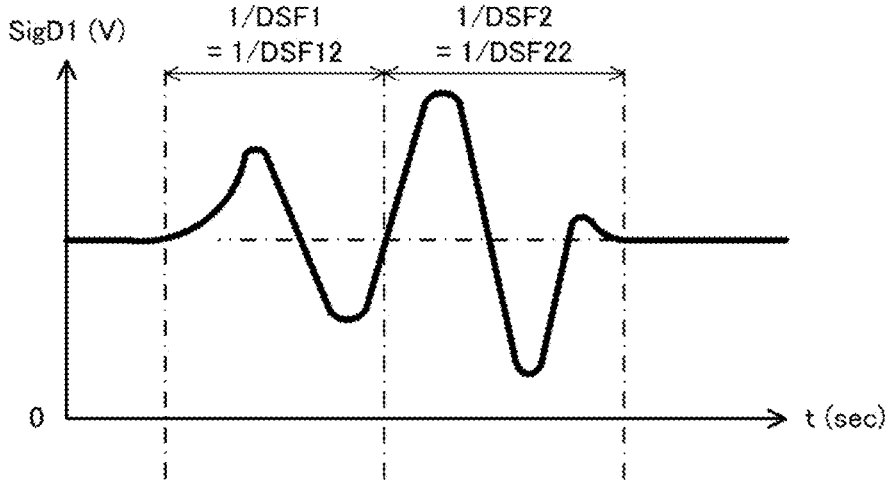
FIG. 14 is an example of the first detection signal SigD1 according to the second exemplary embodiment.

An actuator unit 20a according to a second exemplary embodiment will be described below with reference to the drawings. FIG. 11 is an example of relationships of both a first frequency DSF1 and a second frequency DSF2 with the magnitude F1 of the force applied to the vibrated member 2 by the user 100 according to the second embodiment. FIG. 12 is an example of the drive signal DS according to the second embodiment. FIG. 13 is an example of the first detection signal SigD1 according to the second embodiment. FIG. 14 is an example of the first detection signal SigD1 according to the second embodiment. Regarding the actuator unit 20a according to the second embodiment, only the parts that differ from the actuator unit 20 according to the first embodiment will be described, and the description of the rest will be omitted.

The present exemplary embodiment differs from the actuator unit 20 in that the number of cycles of the burst wave is 2.

Immediately after the burst wave starts to be applied to the actuator 4, the vibration of the vibrated member 2 with respect to the burst wave tends to be delayed. According to an exemplary aspect, the vibration of the vibrated member 2 immediately after the burst wave starts to be applied to the actuator 4 is easily hindered by the static frictional force between the actuator 4 and the adhesive 31, the static frictional force between the actuator 4 and the adhesive 32, the static frictional force between the vibrated member 2 and the frame 3, and the static frictional force between the vibrated member 2 and the user 100. Therefore, the first cycle of the first detection signal SigD1 acquired by the first sensor 5 tends to be longer than the second and subsequent cycles of the first detection signal SigD1. That is, the first cycle of the first detection signal SigD1 tends to differ in length from the second and subsequent cycles of the first detection signal SigD1.

On the other hand, immediately after the burst wave starts to be applied to the actuator 4, the influence of the delay in the vibration of the vibrated member 2 on the burst wave becomes smaller. Therefore, the first detection signal SigD1 has a property that as n increases, the nth cycle of the first detection signal SigD1 decreases and approaches a constant value. Here, n is a positive integer. That is, the first detection signal SigD1 has a property that as n increases, the nth frequency DSFn of the first detection signal SigD1 in the nth cycle increases and approaches a constant value.

In the present exemplary embodiment, on the basis of this property of the first detection signal SigD1, the magnitude F1 of the force applied to the vibrated member 2 by the user 100, estimated by the processing circuit 6, is made more accurate.

As illustrated in FIG. 11, the storage circuit 63 stores the relationships of both the first frequency DSF1 and the second frequency DSF2 with the magnitude F1 of the force applied to a vibrated member 2 by the user 100. The first frequency DSF1 is the frequency of the first detection signal SigD1 in the first cycle. The second frequency DSF2 is the frequency of the first detection signal SigD1 in the second cycle. The arithmetic circuit 62 thus estimates the magnitude F1 of the force applied to the vibrated member 2 by the user 100 on the basis of the first frequency DSF1 and the second frequency DSF2.

In the present exemplary embodiment, as an example, the drive signal DS is a burst wave as illustrated in FIG. 11. In the present exemplary embodiment, the number of cycles of the burst wave is 2.

The operation of the actuator unit 20a will be described below with reference to FIGS. 12 to 14.

As illustrated in FIG. 12, the first sensor 5 acquires a first detection signal SigD1 indicating a relationship between the differential value of the displacement of the vibrated member 2 and the time. In the example of FIG. 13, the user 100 is not applying force to the vibrated member 2.

The first detection signal SigD1 acquired by the first sensor 5 is input to the processing circuit 6. As illustrated in FIG. 13, the first detection signal SigD1 has the first frequency DSF1 and the second frequency DSF2. The processing circuit 6 extracts each of the first frequency DSF1 and the second frequency DSF2 on the basis of the first detection signal SigD1. Each of the first frequency DSF1 and the second frequency DSF2 has a unit Hz for frequency.

Next, the processing circuit 6 estimates the magnitude F1 of the force applied to the vibrated member 2 by the user 100 on the basis of the first frequency DSF1 and the second frequency DSF2. According to an exemplary aspect, as illustrated in FIG. 11, the arithmetic circuit 62 estimates the magnitude F1 of the force applied to the vibrated member 2 by the user 100 on the basis of the first frequency DSF1, the second frequency DSF2, and the relationships of both the first frequency DSF1 and the second frequency DSF2 with the magnitude F1 of the force applied to the vibrated member 2 by the user 100, stored in the storage circuit 63. Specifically, the arithmetic circuit 62 determines a first candidate F1C1 of the magnitude F1 of the force applied to the vibrated member 2 by the user 100 on the basis of the relationship between the first frequency DSF1 and the magnitude F1 of the force applied to the vibrated member 2 by the user 100. In addition, the arithmetic circuit 62 determines a second candidate F1C2 of the magnitude F1 of the force applied to the vibrated member 2 by the user 100 on the basis of the relationship between the second frequency DSF2 and the magnitude F1 of the force applied to the vibrated member 2 by the user 100.

Since the first frequency DSF1 is F, the arithmetic circuit 62 determines the first candidate F1C1 as 0 as illustrated in FIG. 11. In addition, since the second frequency DSF2 is F, the arithmetic circuit 62 determines the second candidate F1C2 as 0 as illustrated in FIG. 11.

Next, the arithmetic circuit 62 estimates the magnitude F1 of the force applied to the vibrated member 2 by the user 100 on the basis of the first candidate F1C1 and the second candidate F1C2. According to an exemplary aspect, the arithmetic circuit 62 estimates, for example, the average of the value of the first candidate F1C1 and the value of the second candidate F1C2 as the magnitude F1 of the force applied to the vibrated member 2 by the user 100. Specifically, since the value of the first candidate F1C1 is 0 and the value of the second candidate F1C2 is 0, the arithmetic circuit 62 estimates the magnitude F1 of the force applied to the vibrated member 2 by the user 100 as 0.

Next, it is assumed that the user 100 applies force to the vibrated member 2. Each of the first frequency DSF1 and the second frequency DSF2 changes due to the change in the magnitude F1 of the force applied to the vibrated member 2 by the user 100. According to an exemplary aspect, the resonance frequency RF1 of the vibration of the vibrated member 2 changes due to the change in the magnitude F1 of the force applied to the vibrated member 2 by the user 100. Thereby, each of the first frequency DSF1 and the second frequency DSF2 changes. Specifically, the first detection signal SigD1 changes as illustrated in FIG. 14.

The processing circuit 6 extracts each of the first frequency DSF1 and the second frequency DSF2 on the basis of the first detection signal SigD1 that has changed. Specifically, as illustrated in FIG. 14, the first frequency DSF1 is DSF12. The second frequency DSF2 is DSF13.

Next, the processing circuit 6 estimates the magnitude F1 of the force applied to the vibrated member 2 by the user 100 on the basis of the first frequency DSF1 and the second frequency DSF2. According to an exemplary aspect, since the first frequency DSF1 is the DSF12, the arithmetic circuit 62 determines the value of the first candidate F1C1 as F1C12 as illustrated in FIG. 11. In addition, since the second frequency DSF2 is the DSF22, the arithmetic circuit 62 determines the value of the second candidate F1C2 as F1C22. Next, the arithmetic circuit 62 estimates the magnitude F1 of the force applied to the vibrated member 2 by the user 100 as (F1C12+F1C22)/2.

According to the actuator unit 20a, the magnitude F1 of the force applied to the vibrated member 2 by the user 100 can be calculated with higher accuracy and with less influence on the tactile feedback to the user 100. According to an exemplary aspect, the vibration of the vibrated member 2 with respect to the burst wave tends to be delayed immediately after the burst wave starts to be applied to the actuator 4 (the first cycle of the first detection signal SigD1). On the other hand, the number of cycles of the burst wave included in the drive signal DS is 2 or more and 5 or less. By setting the number of cycles of the burst wave to 2 or more, the processing circuit 6 can estimate the magnitude F1 of the force applied to the vibrated member 2 by the user 100 on the basis of the nth frequency DSFn of the first detection signal SigD1 in the nth cycle. Here, n is an integer of 2 or more. The value of the nth frequency DSFn of the first detection signal SigD1 in the nth cycle is less affected by the delay in the vibration of the vibrated member 2 on the burst wave than the value of the first frequency DSF1 of the first detection signal SigD1 in the first cycle. This can reduce the influence of the delay in the vibration of the vibrated member 2 on the burst wave. As a result, according to the actuator unit 20a, the magnitude F1 of the force applied to the vibrated member 2 by the user 100 can be calculated with higher accuracy.

Furthermore, by setting the number of cycles of the burst wave to 5 or less, the influence on the tactile feedback to the user 100 can be reduced. As a result, according to the actuator unit 20a, the magnitude F1 of the force applied to the vibrated member 2 by the user 100 can be calculated with higher accuracy and with less influence on the tactile feedback to the user 100.

Third Exemplary Embodiment

Figure 15:
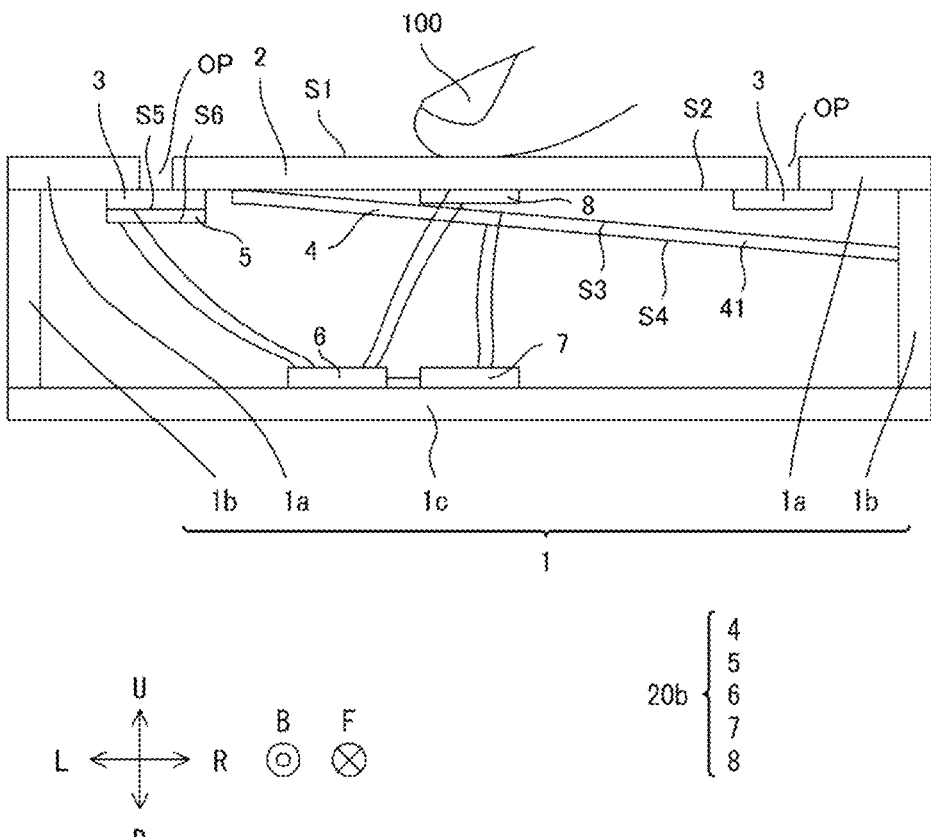
FIG. 15 is a sectional view taken along line A-A of an actuator unit 20b according to a third exemplary embodiment.
Figure 16:
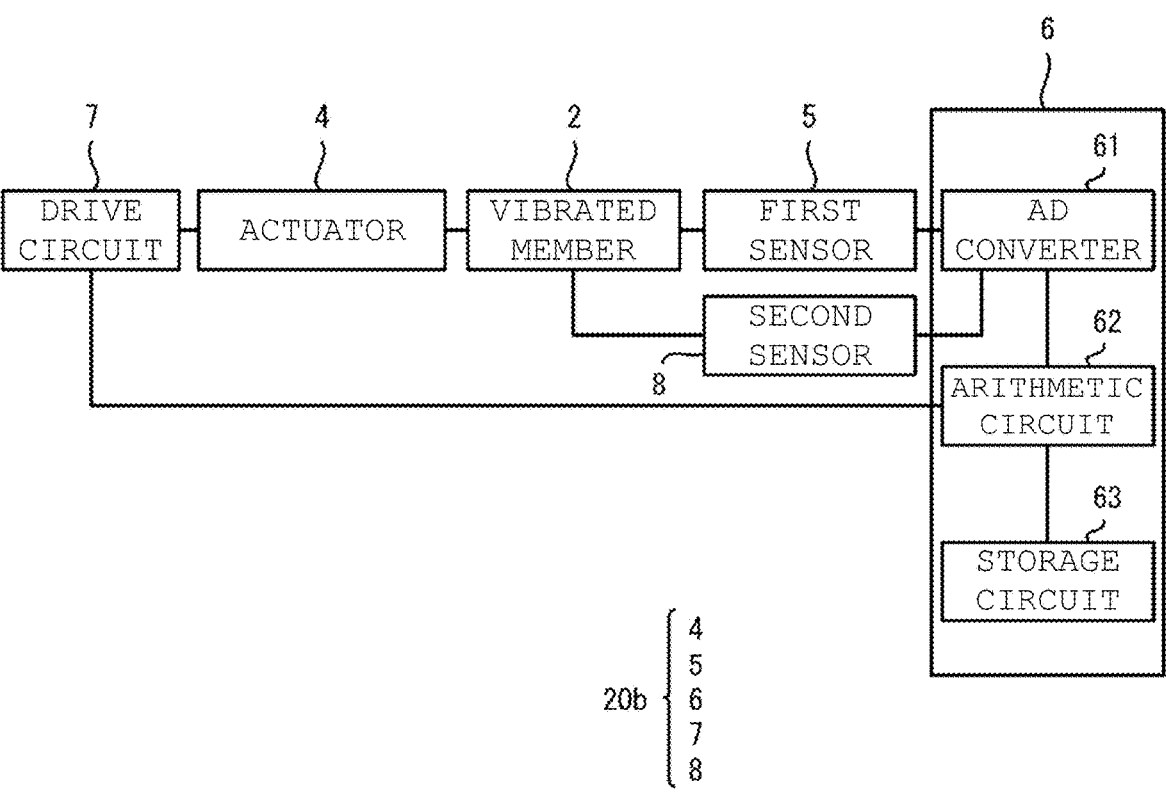
FIG. 16 is a block diagram of the actuator unit 20b according to the third exemplary embodiment.

An actuator unit 20b according to a third exemplary embodiment will be described below with reference to the drawings. FIG. 15 is a sectional view taken along line A-A of the actuator unit 20b according to the third embodiment. FIG. 16 is a block diagram of the actuator unit 20b according to the third embodiment. Regarding the actuator unit 20b according to the third embodiment, only the parts that differ from the actuator unit 20 according to the first embodiment will be described, and the description of the rest will be omitted.

As illustrated in FIG. 15, the actuator unit 20b differs from the actuator unit 20 in further including a second sensor 8. In the present exemplary embodiment, the first detection signal SigD1 acquired by the first sensor 5 indicates the relationship between the physical quantity related to the vibration of the vibrated member 2 in the left-right direction (the direction perpendicular to the normal direction of the upper principal surface S1) and the time. In the present exemplary embodiment, the processing circuit 6 is electrically connected to the drive circuit 7.

In the present exemplary embodiment, the second sensor 8 has the same structure as the first sensor 5. Therefore, although not described in detail, the second sensor 8 includes a third film (not illustrated), a fifth electrode (not illustrated), a sixth electrode (not illustrated), and a second charge amplifier (not illustrated). The third film corresponds to the second film 51 of the first sensor 5. The fifth electrode corresponds to the third electrode 51F of the first sensor 5. The sixth electrode corresponds to the fourth electrode 51B of the first sensor 5. The second charge amplifier corresponds to the first charge amplifier 52 of the first sensor 5. The second sensor 8 includes a piezoelectric body. The second sensor 8 has a film shape.

In the present exemplary embodiment, the uniaxial stretching axis of the third film forms an angle of 45 degrees counterclockwise with respect to the up-down direction and forms an angle of 45 degrees clockwise with respect to the left-right direction. That is, the third film is stretched in at least a uniaxial direction. This angle of 45 degrees includes, for example, angles ranging from 45 degrees plus 10 degrees to 45 degrees minus 10 degrees. As a result, the third film is deformed to be stretched in the up-down direction or deformed to be compressed in the up-down direction, thereby generating charges. For example, when the third film is deformed to be stretched in the up-down direction, positive charges are generated. For example, when the third film is deformed to be compressed in the up-down direction, negative charges are generated. The magnitude of the generated charge depends on the differential value of the displacement of the third film due to expansion or compression.

The second charge amplifier converts the charge generated by the third film into a second detection signal SigD2 that is a voltage signal. After the conversion, the second charge amplifier outputs the second detection signal SigD2 to the processing circuit 6.

In the present exemplary embodiment, as illustrated in FIG. 15, the second sensor 8 is attached to the lower principal surface S2 of the vibrated member 2. According to an exemplary aspect, the second sensor 8 is attached to the lower principal surface S2 of the vibrated member 2 via an insulating adhesive (not illustrated). As a result, in the present exemplary embodiment, the second sensor 8 acquires the second detection signal SigD2 indicating the relationship between the differential value of the deformation amount of the vibrated member 2 in the up-down direction and the time. That is, as illustrated in FIG. 16, the second sensor 8 acquires the second detection signal SigD2 indicating the relationship between the physical quantity related to the deformation amount of the vibrated member 2 in the up-down direction (the normal direction of the upper principal surface S1) and the time. In the present exemplary embodiment, the physical quantity related to the deformation amount of the vibrated member 2 in the up-down direction (the normal direction of the upper principal surface S1) is the differential value of the deformation amount of the vibrated member 2 in the up-down direction.

As illustrated in FIG. 15, the processing circuit 6 is electrically connected to the second sensor 8. According to an exemplary aspect, the AD converter 61 is electrically connected to the second charge amplifier of the second sensor 8. Thereby, the second detection signal SigD2 output from the second charge amplifier of the second sensor 8 is input to the AD converter 61 as illustrated in FIG. 16. That is, the second detection signal SigD2 acquired by the second sensor 8 is input to the processing circuit 6.

The AD converter 61 performs AD conversion on the second detection signal SigD2. The AD converter 61 thus converts the second detection signal SigD2 into a digital signal.

The AD converter 61 sets a second reference value of the second detection signal SigD2 on the basis of the reference voltage. Then, as illustrated in FIG. 16, the AD converter 61 outputs the second detection signal SigD2 to the arithmetic circuit 62.

The arithmetic circuit 62 estimates that the user 100 has applied force to the upper principal surface S1 of the vibrated member 2 on the basis of the second detection signal SigD2. That is, the processing circuit 6 estimates that the user 100 has applied force to the upper principal surface S1 on the basis of the second detection signal SigD2.

Specifically, the storage circuit 63 stores a program for a process to estimate that the user 100 has applied force to the upper principal surface S1 on the basis of the second detection signal SigD2. Thereby, the arithmetic circuit 62 performs the process to estimate that the user 100 has applied force to the upper principal surface S1 on the basis of the second detection signal SigD2.

According to an exemplary aspect, the arithmetic circuit 62 determines, for example, whether the value of the second detection signal SigD2 is equal to or greater than a preset first threshold value. When the value of the second detection signal SigD2 is less than the first threshold value, the arithmetic circuit 62 determines that the user 100 has not applied force to the upper principal surface S1. On the other hand, when the value of the second detection signal SigD2 is equal to or greater than the first threshold value, the arithmetic circuit 62 determines that the user 100 has applied force to the upper principal surface S1.

When the arithmetic circuit 62 determines that the user 100 has applied force to the upper principal surface S1, the arithmetic circuit 62 outputs, to the drive circuit 7, a determination signal indicating that the user 100 has applied force to the upper principal surface S1, for example. That is, the processing circuit 6 outputs, to the drive circuit 7, a determination signal indicating that the user 100 has applied force to the upper principal surface S1.

When the determination signal is input from the processing circuit 6, the drive circuit 7 applies the drive signal DS to the actuator 4, for example. This causes the actuator 4 to vibrate the vibrated member 2 on the basis of the drive signal DS. Furthermore, the first sensor 5 acquires the first detection signal SigD1 indicating the relationship between the physical quantity related to the vibration of the vibrated member 2 and the time.

According to the actuator unit 20b, it is possible to estimate that the user 100 has applied force to the upper principal surface S1 and calculate the magnitude F1 of the force applied to the vibrated member 2 by the user 100 with higher accuracy. According to an exemplary aspect, the actuator unit 20b includes the second sensor 8. The second sensor 8 acquires the second detection signal SigD2 indicating the relationship between the physical quantity related to the deformation amount of the vibrated member 2 In the up-down direction (the normal direction of the upper principal surface S1) and the time. This enables the processing circuit 6 to estimate with high accuracy that the user 100 has applied force to the upper principal surface S1 on the basis of the second detection signal SigD2. As described above, the magnitude F1 of the force applied to the vibrated member 2 by the user 100 increases as the frequency DSF of the first detection signal SigD1 increases. That is, the frequency DSF of the first detection signal SigD1 increases as the magnitude F1 of the force applied to the vibrated member 2 by the user 100 increases. Thereby, the magnitude F1 of the force applied to the vibrated member 2 by the user 100 can be calculated with higher accuracy by using, as the first sensor 5, a sensor configured to detect with high accuracy a frequency range equal to or higher than the frequency of the vibration of the vibrated member 2 when the user 100 is not applying force to the upper principal surface S1. As a result, according to the actuator unit 20b, it is possible to estimate that the user 100 has applied force to the upper principal surface S1 with higher accuracy and calculate the magnitude F1 of the force applied to the vibrated member 2 by the user 100.

Fourth Exemplary Embodiment

Figure 17:
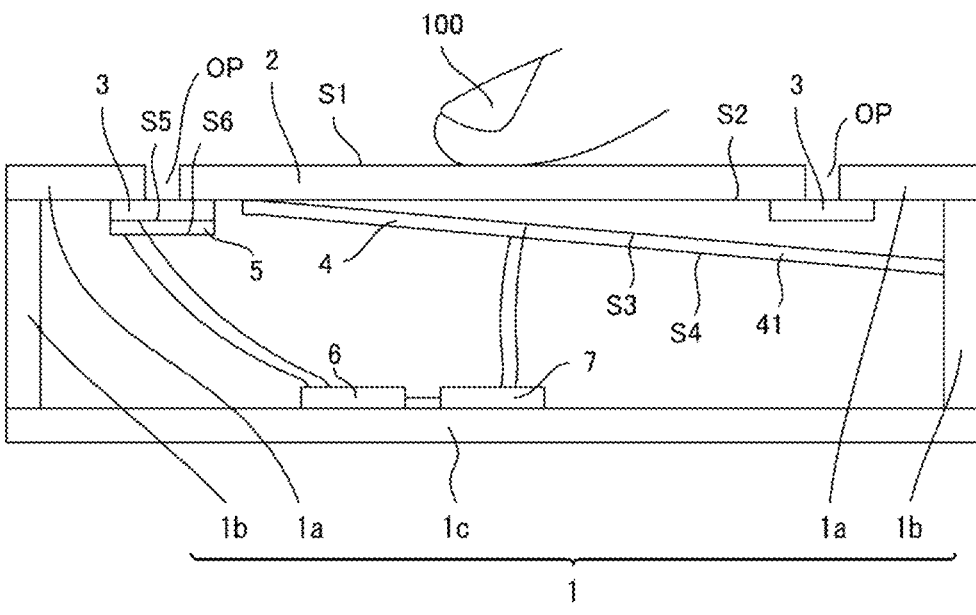
FIG. 17 is a sectional view taken along line A-A of an actuator unit 20c according to a fourth exemplary embodiment.

An actuator unit 20c according to a fourth exemplary embodiment will be described below with reference to the drawings. FIG. 17 is a sectional view taken along line A-A of the actuator unit 20c according to the fourth embodiment. Regarding the actuator unit 20c according to the fourth embodiment, only the parts that differ from the actuator unit 20b according to the third embodiment will be described, and the description of the rest will be omitted.

As illustrated in FIG. 17, the actuator unit 20c differs from the actuator unit 20b in that the second sensor 8 is not provided.

In the present exemplary embodiment, the first detection signal SigD1 acquired by the first sensor 5 indicates the relationship between the physical quantity related to the vibration of the vibrated member 2 in the left-right direction (the direction perpendicular to the normal direction of the upper principal surface S1) and the time. In the present exemplary embodiment, the processing circuit 6 is electrically connected to the drive circuit 7.

The arithmetic circuit 62 estimates that the user 100 has applied the force to the upper principal surface S1 of the vibrated member 2 on the basis of the first detection signal SigD1. That is, the processing circuit 6 estimates that the user 100 has applied force to the upper principal surface S1 on the basis of the first detection signal SigD1.

Specifically, the storage circuit 63 stores a program for a process to estimate that the user 100 has applied force to the upper principal surface S1 on the basis of the first detection signal SigD1. Thereby, the arithmetic circuit 62 performs the process to estimate that the user 100 has applied force to the upper principal surface S1 on the basis of the first detection signal SigD1.

According to an exemplary aspect, the arithmetic circuit 62 first performs a filtering process for the first detection signal SigD1. Specifically, the frequency of the force applied to the vibrated member 2 by the user 100 is, for example, about 10 Hz. On the other hand, the frequency of the vibration of the vibrated member 2 is not necessarily about 10 Hz because the frequency varies depending on the frequency F of the drive signal DS, the resonance frequency RF1 of the vibration of the vibrated member 2, and the magnitude F1 of the force applied to the vibrated member 2 by the user 100. The frequency of the vibration of the vibrated member 2 when the user 100 is not applying force to the upper principal surface S1 is, for example, about 200 Hz. The arithmetic circuit 62 extracts a 10 Hz component of the first detection signal SigD1 and a 200 Hz or higher component of the first detection signal SigD1 on the basis of the first detection signal SigD1 by the filtering process.

Next, the arithmetic circuit 62 determines whether the value of the 10 Hz component of the first detection signal SigD1 is equal to or greater than a preset second threshold value. When the value of the 10 Hz component of the first detection signal SigD1 is less than the second threshold, the arithmetic circuit 62 determines that the user 100 has not applied force to the upper principal surface S1. On the other hand, when the value of the 10 Hz component of the first detection signal SigD1 is equal to or greater than the second threshold value, the arithmetic circuit 62 determines that the user 100 has applied force to the upper principal surface S1.

When the arithmetic circuit 62 determines that the user 100 has applied the force to the upper principal surface S1, the arithmetic circuit 62 outputs, to the drive circuit 7, a determination signal indicating that the user 100 has applied the force to the upper principal surface S1. That is, the processing circuit 6 outputs, to the drive circuit 7, a determination signal indicating that the user 100 has applied force to the upper principal surface S1.

When the determination signal is input from the processing circuit 6, the drive circuit 7 applies the drive signal DS to the actuator 4. This causes the actuator 4 to vibrate the vibrated member 2 on the basis of the drive signal DS. Furthermore, the first sensor 5 acquires the first detection signal SigD1 indicating the relationship between the physical quantity related to the vibration of the vibrated member 2 and the time. In addition, the processing circuit 6 extracts the parameter depending on the variation cycle of the physical quantity related to the vibration of the vibrated member 2 on the basis of the 200 Hz or higher component of the first detection signal SigD1.

According to the actuator unit 20c, it is possible to estimate that the user 100 has applied force to the upper principal surface S1 using one sensor and to calculate the magnitude F1 of the force applied to the vibrated member 2 by the user 100 with high accuracy. According to an exemplary aspect, the first detection signal SigD1 acquired by the first sensor 5 indicates the relationship between the physical quantity related to the vibration of the vibrated member 2 in the left-right direction (the direction perpendicular to the normal direction of the upper principal surface S1) and the time. The force applied to the upper principal surface S1 when the user 100 presses from above includes a component in the left-right direction as well as a component in the up-down direction. The processing circuit 6 thus estimates that the user 100 has applied the force to the upper principal surface S1 on the basis of the first detection signal SigD1.

According to an exemplary aspect, when the actuator unit 20 is used as an actuator unit that gives tactile feedback to the user 100 by vibrating the vibrated member 2 when the user 100 presses the vibrated member 2, the frequency at which the vibrated member 2 is driven when the user 100 is not applying force to the upper principal surface S1 is higher than the frequency of the force applied to the vibrated member 2 by the user 100. For example, it is assumed that the frequency of the force applied to the vibrated member 2 by the user 100 is about 10 Hz. Furthermore, for example, it is assumed that the frequency at which the vibrated member 2 is driven when the user 100 is not applying force to the upper principal surface S1 is about 200 Hz. The frequency DSF of the first detection signal SigD1 increases as the magnitude F1 of the force applied to the vibrated member 2 by the user 100 increases. That is, the frequency of the vibration of the vibrated member 2 when the user 100 is applying force to the upper principal surface S1 increases as the magnitude F1 of the force applied to the vibrated member 2 by the user 100 increases. That is, the frequency of the vibration of the vibrated member 2 differs from the frequency of the force applied to the vibrated member 2 by the user 100. From the above, the processing circuit 6 extracts the 10 Hz component of the first detection signal SigD1 on the basis of the first detection signal SigD1 and estimates that the user 100 has applied the force to the upper principal surface S1 on the basis of the 10 Hz component of the first detection signal SigD1.

In addition, the processing circuit 6 extracts the 200 Hz or higher component of the first detection signal SigD1 on the basis of the first detection signal SigD1, and estimates the magnitude F1 of the force applied to the vibrated member 2 by the user 100 on the basis of the 200 Hz or higher component of the first detection signal SigD1. As a result, according to the actuator unit 20c, it is possible to estimate that the user 100 has applied force to the upper principal surface S1 using one sensor and to calculate the magnitude F1 of the force applied to the vibrated member 2 by the user 100 with high accuracy.

First Modification

Figure 18:
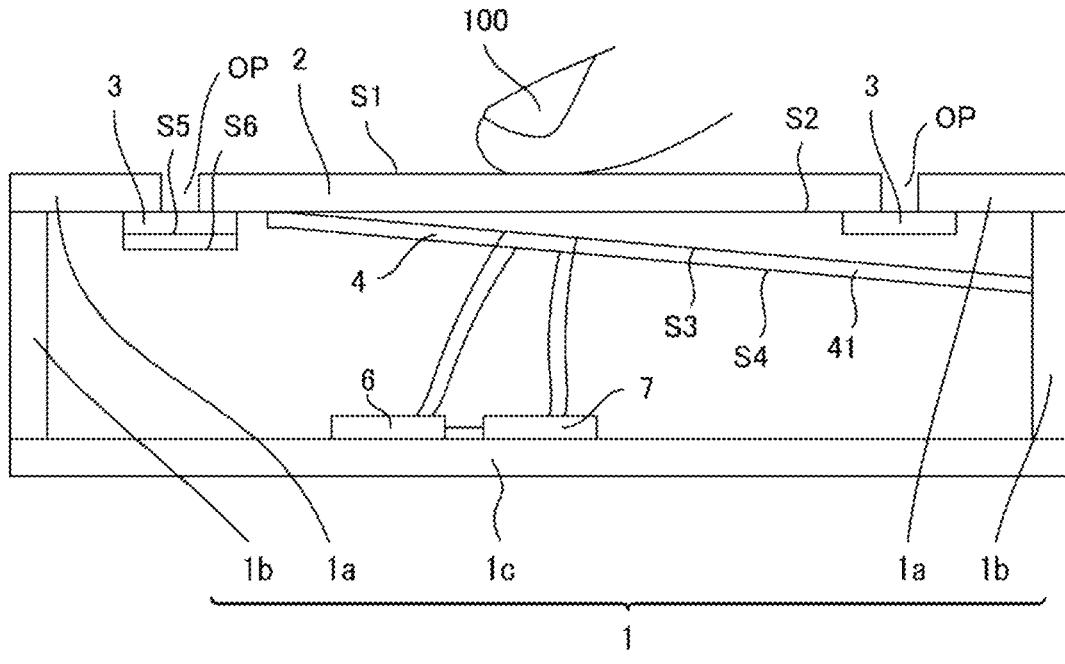
FIG. 18 is a sectional view taken along line A-A of an actuator unit 20d according to a first modification of an exemplary aspect.
Figure 19:
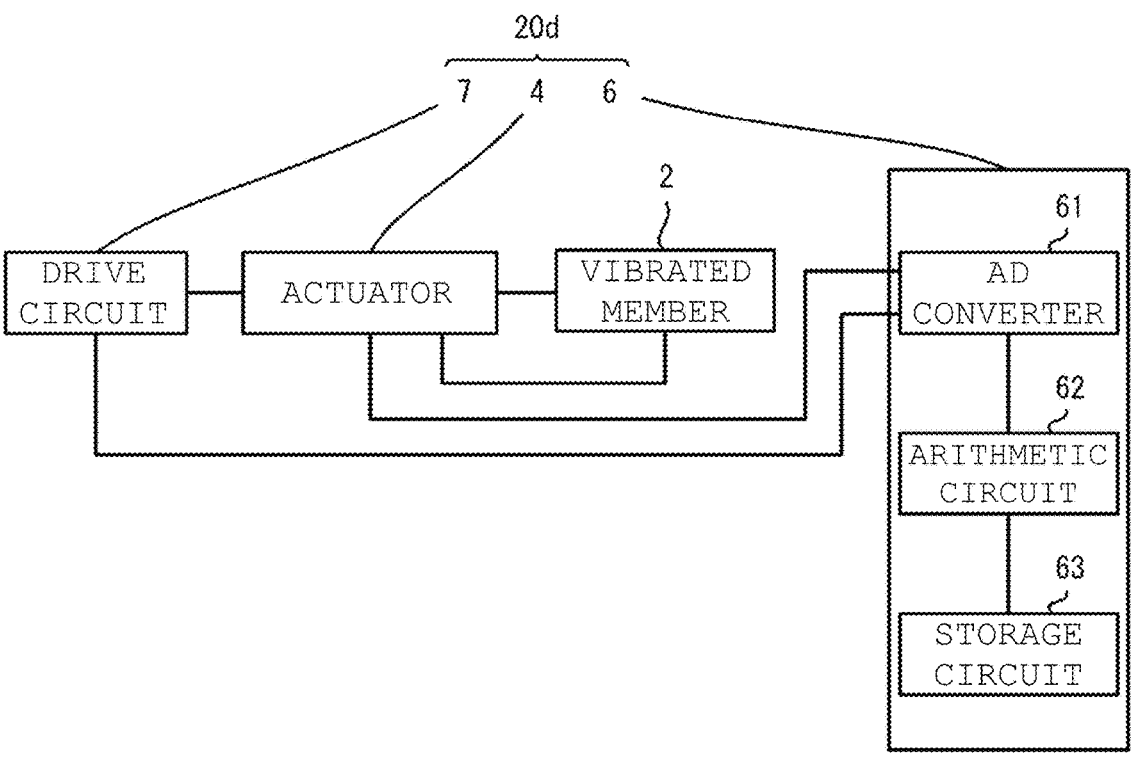
FIG. 19 is a block diagram of the actuator unit 20d according to the first modification of an exemplary aspect.

An actuator unit 20d according to a first modification will be described below with reference to the drawings. FIG. 18 is a sectional view taken along line A-A of the actuator unit 20d according to the first modification. FIG. 19 is a block diagram of the actuator unit 20d according to the first modification. In the actuator unit 20d according to the first modification, only the parts that differ from the actuator unit 20 according to the first embodiment will be described, and the description of the rest will be omitted.

As illustrated in FIG. 18, the actuator unit 20d differs from the actuator unit 20 in that the first sensor 5 is not provided and that the actuator 4 and the first sensor 5 are the same member.

In the present modification, the actuator 4 is electrically connected to the processing circuit 6 as illustrated in FIG. 18. According to an exemplary aspect, the AD converter 61 of the processing circuit 6 is electrically connected to each of the first electrode (not illustrated) and the second electrode (not illustrated) of the actuator 4. In the present modification, the processing circuit 6 is electrically connected to the drive circuit 7 as illustrated in FIG. 18.

The actuator 4 is deformed to be stretched along the long side of the actuator 4 or deformed to be compressed along the long side of the actuator 4, thereby generating charges. For example, when the actuator 4 is deformed to be stretched along the long side of the actuator 4, positive charges are generated. For example, when the actuator 4 is deformed to be compressed along the long side of the actuator 4, negative charges are generated. The magnitude of the generated charge depends on the differential value of the displacement of the actuator 4 due to expansion or compression. As a result, the actuator 4 acquires the first detection signal SigD1 indicating the relationship between the physical quantity related to the vibration of the vibrated member 2 and the time.

As illustrated in FIG. 19, the drive circuit 7 applies the drive signal DS to the actuator 4. Thereby, as illustrated in FIG. 19, the actuator 4 vibrates the vibrated member 2 on the basis of the drive signal DS. As illustrated in FIG. 19, the drive signal DS is input to the processing circuit 6. As illustrated in FIG. 19, the actuator 4 acquires the first detection signal SigD1 indicating the relationship between the physical quantity related to the vibration of the vibrated member 2 and the time. As illustrated in FIG. 19, the first detection signal SigD1 acquired by the actuator 4 is input to the processing circuit 6.

The processing circuit 6 extracts the parameter depending on the variation cycle of the physical quantity related to the vibration of the vibrated member 2 on the basis of the drive signal DS and the first detection signal SigD1. According to an exemplary aspect, the processing circuit 6 extracts the parameter depending on the variation cycle of the physical quantity related to the vibration of the vibrated member 2 on the basis of the first detection signal SigD1 in a period when the drive signal DS is not being applied to the actuator 4.

According to the actuator unit 20d, the actuator 4 and the first sensor 5 are made common, and the magnitude F1 of the force applied to the vibrated member 2 by the user 100 can be calculated with high accuracy. According to an exemplary aspect, the actuator 4 and the first sensor 5 are the same member. This causes the actuator 4 to vibrate the vibrated member 2 and acquire the first detection signal SigD1 indicating the relationship between the physical quantity related to the vibration of the vibrated member 2 and the time. According to an exemplary aspect, in a period when the drive signal DS is being applied to the actuator 4, the drive signal DS output from the drive circuit 7 is being input to the first electrode and the second electrode of the actuator 4. On the other hand, in a period when the drive signal DS is not being applied to the actuator 4, the drive signal DS output from the drive circuit 7 is not being input to the first electrode or the second electrode of the actuator 4, so that the actuator 4 can acquire the first detection signal SigD1 indicating the relationship between the physical quantity related to the vibration of the vibrated member 2 and the time. This enables the actuator 4 to vibrate the vibrated member 2 and acquire the first detection signal SigD1 indicating the relationship between the physical quantity related to the vibration of the vibrated member 2 and the time.

Furthermore, the processing circuit 6 extracts the parameter depending on the variation cycle of the physical quantity related to the vibration of the vibrated member 2 on the basis of the drive signal DS and the first detection signal SigD1. According to an exemplary aspect, the processing circuit 6 extracts the parameter depending on the variation cycle of the physical quantity related to the vibration of the vibrated member 2 on the basis of the first detection signal SigD1 acquired by the actuator 4 in the period when the drive signal DS is not being applied to the actuator 4. As a result, the processing circuit 6 can calculate the magnitude F1 of the force applied to the vibrated member 2 by the user 100. As a result, according to the actuator unit 20d, the actuator 4 and the first sensor 5 can be made common, and the magnitude F1 of the force applied to the vibrated member 2 by the user 100 can be calculated with high accuracy.

Additional Exemplary Embodiments

It is noted that the actuator unit according to the present disclosure is not limited to the actuator units 20, 20a, 20b, 20c, 20d, and can be changed within the scope of the gist thereof. Furthermore, the configurations of the actuator units 20, 20a, 20b, 20c, 20d may be arbitrarily combined.

For example, the vibrated member 2 may not have the upper principal surface S1 or the lower principal surface S2. The vibrated member 2 may have, for example, a columnar shape, a conical shape, a spherical shape, or an elliptical shape.

The force applied to the vibrated member 2 by the user 100 may not be the force applied to the upper principal surface S1 by the user 100. The force applied to the vibrated member 2 by the user 100 may be, for example, the force with which the user 100 grips the vibrated member 2.

The drive circuit 7 may be omitted according to alternative exemplary embodiments.

The actuator 4 may not include a piezoelectric body. The actuator 4 may be, for example, a linear resonant actuator (LRA).

The direction in which the actuator 4 vibrates the vibrated member 2 is not limited to the left-right direction. The direction in which the actuator 4 vibrates the vibrated member 2 may be, for example, the front-rear direction or an arbitrary direction.

It is noted that neither the first sensor 5 nor the second sensor 8 may include a piezoelectric body. Each of the first sensor 5 and the second sensor 8 may be, for example, a strain gauge or a capacitive sensor.

It is also noted that neither the first charge amplifier 52 nor the second charge amplifier is essential.

The first sensor 5 may further include a voltage amplifier circuit that amplifies the first detection signal SigD1. The second sensor 8 may further include a voltage amplifier circuit that amplifies the second detection signal SigD2.

The first sensor 5 may not be attached to the frame 3. For example, the first sensor 5 may be attached to the vibrated member 2 or may be attached across the frame 3 and the vibrated member 2. In addition, the first sensor 5 may acquire the first detection signal SigD1 indicating the relationship between the physical quantity related to the vibration of the vibrated member 2 and the time without contacting the frame 3 or the vibrated member 2. Such a first sensor 5 is, for example, a laser displacement meter.

Each of the second film 51 and the third film may have a piezoelectric constant of d31. Each of the second film 51 and the third film having a piezoelectric constant of d31 is, for example, a polyvinylidene fluoride (PVDF) film.

The AD converter 61 may be omitted according to alternative exemplary embodiments.

The arithmetic circuit 62 is not necessarily a CPU. The arithmetic circuit 62 may be, for example, a micro processing unit (MPU).

The storage circuit 63 does not necessarily include the ROM. The storage circuit 63 may include, for example, a flash memory instead of the ROM.

The actuator unit 20 may further include a display circuit that displays the force data output from the arithmetic circuit 62.

The actuator unit 20 may further include a communication circuit that transmits the force data output from the arithmetic circuit 62 to the outside.

The physical quantity related to the vibration of the vibrated member 2 is not limited to the differential value of the displacement of the vibrated member 2. The physical quantity related to the vibration of the vibrated member 2 is, for example, the displacement of the vibrated member 2 or the acceleration of the vibrated member 2.

It is noted that the parameter depending on the variation cycle of the physical quantity related to the vibration of the vibrated member 2 is not limited to the frequency DSF of the first detection signal SigD1. The parameter depending on the variation cycle of the physical quantity related to the vibration of the vibrated member 2 is, for example, a rise time TR of the first detection signal SigD1, a fall time TF of the first detection signal SigD1, or a time TPP between the peaks of the first detection signal SigD1.

For example, as illustrated in FIG. 10, the rise time TR of the first detection signal SigD1 is the time during which the first detection signal SigD1 goes from 0 to a maximum value P1 of the first detection signal SigD1. In this case, the storage circuit 63 may store the relationship between the rise time TR of the first detection signal SigD1 and the magnitude F1 of the force applied to the vibrated member 2 by the user 100. The arithmetic circuit 62 thus estimates the magnitude F1 of the force applied to the vibrated member 2 by the user 100 on the basis of the rise time TR of the first detection signal SigD1. In this case as well, the same effect as that of the actuator unit 20 is obtained. Note that the rise time TR of the first detection signal SigD1 is not limited to the time during which the first detection signal SigD1 goes from 0 to the maximum value P1 of the first detection signal SigD1.

For example, as illustrated in FIG. 10, the fall time TF of the first detection signal SigD1 is the time during which the first detection signal SigD1 goes from 0 to a minimum value P2 of the first detection signal SigD1. In this case, the storage circuit 63 may store the relationship between the fall time TF of the first detection signal SigD1 and the magnitude F1 of the force applied to the vibrated member 2 by the user 100. The arithmetic circuit 62 thus estimates the magnitude F1 of the force applied to the vibrated member 2 by the user 100 on the basis of the fall time TF of the first detection signal SigD1. In this case as well, the same effect as that of the actuator unit 20 is obtained. Note that the fall time TF of the first detection signal SigD1 is not limited to the time during which the first detection signal SigD1 goes from 0 to the minimum value P2 of the first detection signal SigD1.

For example, as illustrated in FIG. 10, the time TPP between the peaks of the first detection signal SigD1 is the time during which the first detection signal SigD1 goes from the maximum value P1 of the first detection signal SigD1 to the minimum value P2 of the first detection signal SigD1. In this case, the storage circuit 63 may store the relationship between the time TPP between the peaks of the first detection signal SigD1 and the magnitude F1 of the force applied to the vibrated member 2 by the user 100. The arithmetic circuit 62 thus estimates the magnitude F1 of the force applied to the vibrated member 2 by the user 100 on the basis of the time TPP between the peaks of the first detection signal SigD1. In this case as well, the same effect as that of the actuator unit 20 is obtained. Note that the time TPP between the peaks of the first detection signal SigD1 is not limited to the time during which the first detection signal SigD1 goes from the maximum value P1 of the first detection signal SigD1 to the minimum value P2 of the first detection signal SigD1.

The parameter depending on the variation cycle of the physical quantity related to the vibration of the vibrated member 2 may have a unit for time. The unit for time is, for example, sec. The parameter depending on the variation cycle of the physical quantity related to the vibration of the vibrated member 2 having the unit for time is, for example, the rise time TR of the first detection signal SigD1, the fall time TF of the first detection signal SigD1, or the time TPP between the peaks of the first detection signal SigD1.

Although the case where the burst wave is a sine wave has been described as an example, the burst wave is not limited to a sine wave. The burst wave may be a wave that changes cyclically. The cyclically changing wave is, for example, a triangular wave, a sawtooth wave, or a rectangular wave.

Although the case where the number of cycles of the burst wave is 1 or 2 has been described as an example, the number of cycles of the burst wave is not limited to 1 or 2. In the actuator unit 20a according to the present disclosure, theoretically, the number of cycles of the burst wave may be higher than 5.

The second sensor 8 may not be attached to the lower principal surface S2 of the vibrated member 2. For example, the second sensor 8 may be attached to the upper principal surface S1 of the vibrated member 2 or may be attached to the frame 3. For example, the second sensor 8 may be attached across the vibrated member 2 and the frame 3. In addition, the second sensor 8 may acquire the second detection signal SigD2 indicating the relationship between the physical quantity related to the deformation amount of the upper principal surface S1 of the vibrated member 2 in the normal direction and the time without contacting the vibrated member 2 or the frame 3. Such a second sensor 8 is, for example, a laser displacement meter.

The physical quantity related to the deformation amount of the vibrated member 2 in the up-down direction (the normal direction of the upper principal surface S1) is not limited to the differential value of the deformation amount of the vibrated member 2 in the up-down direction. The physical quantity related to the deformation amount of the vibrated member 2 in the up-down direction (the normal direction of the upper principal surface S1) is, for example, the deformation amount of the vibrated member 2 in the up-down direction (the normal direction of the upper principal surface S1) or the acceleration of the deformation amount of the vibrated member 2 in the up-down direction (the normal direction of the upper principal surface S1).

The actuator 4 and the first sensor 5 may be integrated. The actuator 4, the first sensor 5, and the second sensor 8 may be integrated.

The processing circuit 6 may not be electrically connected to the drive circuit 7.

In the actuator unit 20a, the method by which the processing circuit 6 estimates the magnitude F1 of the force applied to the vibrated member 2 by the user 100 is not limited to estimating the average of the values of the first candidate F1C1 and the second candidate F1C2 as the magnitude F1 of the force applied to the vibrated member 2 by the user 100. For example, the processing circuit 6 may estimate the value of the second candidate F1C2 as the magnitude F1 of the force applied to the vibrated member 2 by the user 100, or may estimate the weighted average of the value of the first candidate F1C1 and the value of the second candidate F1C2 as the magnitude F1 of the force applied to the vibrated member 2 by the user 100.

The method by which the processing circuit 6 estimates that the user 100 has applied force to the upper principal surface S1 on the basis of the second detection signal SigD2 is not limited to determining whether the value of the second detection signal SigD2 is equal to or greater than a preset first threshold value.

The method by which the processing circuit 6 estimates that the user 100 has applied force to the upper principal surface S1 on the basis of the first detection signal SigD1 is not limited to determining whether the value of the 10 Hz component of the first detection signal SigD1 is equal to or greater than a preset second threshold value.

The frequency of the force applied to the vibrated member 2 by the user 100 is not limited to about 10 Hz. The frequency of the vibration of the vibrated member 2 when the user 100 is not applying force to the upper principal surface S1 is not limited to about 200 Hz. That is, the arithmetic circuit 62 may extract a frequency component other than the 10 Hz component of the first detection signal SigD1 and the 200 Hz or higher component of the first detection signal SigD1 on the basis of first detection signal SigD1 by the filtering process.

As illustrated in FIG. 1, the actuator unit 20 and the vibrated member 2 may be modularized to form a tactile sense presentation device 30. In this case, the tactile sense presentation device 30 can calculate the magnitude F1 of the force applied to the vibrated member 2 by the user 100 with high accuracy.

As illustrated in FIG. 1, the actuator unit 20 and the housing 1 may be modularized to form a housing module 40. In this case, the housing module 40 can calculate the magnitude F1 of the force applied to the vibrated member 2 by the user 100 with high accuracy.

As illustrated in FIG. 1, the tactile sense presentation device 30 and the housing 1 may be modularized to form a housing module 50. In this case, the housing module 50 can calculate the magnitude F1 of the force applied to the vibrated member 2 by the user 100 with high accuracy.

The actuator unit 20 may be used for a game controller, for example. For example, the actuator unit 20 may be used as an actuator unit that gives the user 100 a sense of realism by vibrating the vibrated member 2 when the user 100 grips the vibrated member 2.

Hereinafter, a description will be given of a method for verifying whether or not the process shown in the first embodiment has been performed in the actuator unit 20. In the verification, it can be considered that the process described in the first embodiment is performed when each of the first detection signal SigD1 and the force data indicating the magnitude F1 of the force applied to the vibrated member 2 by the user 100 is identified.

In the verification, each of a signal IS input to the processing circuit 6 and data ODA output from the processing circuit 6 is measured.

Next, the magnitude F1 of the force applied to the vibrated member 2 is changed. At this time, each of the signal IS input to the processing circuit 6 and the data ODA output from the processing circuit 6 is measured. The first detection signal SigD1 has a property that the cycle of the change in physical quantity changes when the magnitude F1 of the force applied to the vibrated member 2 changes. Therefore, when the cycle of the change in the signal IS changes before and after the magnitude F1 of the force applied to the vibrated member 2 is changed, the signal IS can be identified as the first detection signal SigD1.

The force data indicating the magnitude F1 of the force applied to the vibrated member 2 by the user 100 has a property that the cycle of the change in physical quantity changes. Therefore, when the cycle of the change in the signal IS changes before and after the magnitude F1 of the force applied to the vibrated member 2 is changed, the data ODA can be identified as force data indicating the magnitude F1 of the force applied to the vibrated member 2 by the user 100.

In particular, since the force data indicating the magnitude F1 of the force applied to the vibrated member 2 by the user 100 has a property that the force increases as the cycle of the change in physical quantity decreases, the signal IS and the data ODA satisfying this condition can be identified as the first detection signal SigD1 and the force data indicating the magnitude F1 of the force applied to the vibrated member 2 by the user 100.

By the method shown above, each of the first detection signal SigD1 and the force data indicating the magnitude F1 of the force applied to the vibrated member 2 by the user 100 can be identified. It can be considered that the process described in the first embodiment is performed when each of the first detection signal SigD1 and the force data indicating the magnitude F1 of the force applied to the vibrated member 2 by the user 100 is identified.

DESCRIPTION OF REFERENCE SYMBOLS

1: Housing
1a: First housing portion
1b: Second housing portion
1c: Third housing portion
2: Vibrated member 3: Frame
4: Actuator
5: First sensor
6: Processing circuit
7: Drive circuit
8: Second sensor
20, 20*a*, 20*b*, 20*c*, 20*d*: Actuator unit
30: Tactile sense presentation device
31, 32: Adhesive
40, 50: Housing module
41: First film
51: Second film
51*f*: Third electrode
51*b*: Fourth electrode
52: First charge amplifier
61: AD converter
62: Arithmetic circuit
63: Storage circuit
100: User
DS: Drive signal
F, DSF: Frequency
DSF1: First frequency
DSF2: Second frequency
DSFN: nth frequency
F1C1: First candidate
F1C2: Second candidate
OD: Uniaxial stretching axis
OP: Opening
RF1: Resonance frequency
S1: Upper principal surface
S2: Lower principal surface
S3: Third principal surface
S4: Fourth principal surface
S5: Fifth principal surface
S6: Sixth principal surface
SigD1: First detection signal
SigD2: Second detection signal
k1, k2, k3, k4, k5: Elastic coefficient
m1, m2: Mass

What is claimed is:

1. An actuator unit, comprising:
an actuator configured to cause a vibration by a vibrated member when a force is applied to the vibrated member;
a first sensor configured to generate a first detection signal indicating a first relationship of a first physical quantity varying with time, the first physical quantity being related to the vibration of the vibrated member, a variation cycle of the first physical quantity changing based on a magnitude of the force applied to the vibrated member; and
a processing circuit configured to process the first detection signal, extract a parameter indicative of the variation cycle of the first physical quantity, and to estimate the magnitude of the force applied to the vibrated member based on the parameter.

2. The actuator unit according to claim 1, wherein the parameter has a unit of frequency or a unit of time.

3. The actuator unit according to claim 1, wherein the parameter is at least one of a frequency of the first detection signal, a rise time of the first detection signal, a fall time of the first detection signal, and a time between peaks of the first detection signal.

4. The actuator unit according to claim 1, further comprising:

a drive circuit configured to apply a drive signal to the actuator to cause the actuator to vibrate the vibrated member, the drive signal including a burst wave.

5. The actuator unit according to claim 4, wherein a number of cycles in the burst wave is equal to or more than 1 and is equal to or less than 5.

6. The actuator unit according to claim 1, wherein the actuator vibrates the vibrated member in a direction perpendicular to a normal direction of a principal surface of the vibrated member where the force is applied.

7. The actuator unit according to claim 6, wherein:
the first detection signal indicates the first relationship of the first physical quantity of the vibration that is in the direction perpendicular to the normal direction of the principal surface of the vibrated member, and
the processing circuit is configured to estimate the force applied to the principal surface based on the first detection signal.

8. The actuator unit according to claim 7, further comprising:
a second sensor configured to generate a second detection signal that indicates a second relationship of a second physical quantity varying with time, the second physical quantity being related to a deformation amount of the principal surface of the vibrated member in the normal direction,
wherein the processing circuit is configured to estimate the force applied to the principal surface based on the second detection signal.

9. The actuator unit according to claim 1, wherein the first sensor includes a piezoelectric body.

10. The actuator unit according to claim 1, wherein the actuator and the first sensor are a same member.

11. An actuator unit, comprising:
an actuator configured to cause a vibration by a vibrated member when a force is applied to the vibrated member;
a first sensor configured to generate a first detection signal indicating a first relationship of a first physical quantity varying with time, the first physical quantity being related to the vibration of the vibrated member, a variation cycle of the first physical quantity changing based on a magnitude of the force applied to the vibrated member; and
a processing circuit configured to output force data indicating the magnitude of the force based on the first detection signal, the force data changing when the variation cycle of the first physical quantity changes.

12. The actuator unit according to claim 11, wherein the force data increases with a decrease in the variation cycle of the first physical quantity.

13. The actuator unit according to claim 11, further comprising a drive circuit configured to apply a drive signal to the actuator to cause the actuator to vibrate the vibrated member, the drive signal including a burst wave.

14. The actuator unit according to claim 13, wherein a number of cycles in the burst wave is equal to or more than 1 and is equal to or less than 5.

15. The actuator unit according to claim 11, wherein the actuator vibrates the vibrated member in a direction perpendicular to a normal direction of a principal surface of the vibrated member where the force is applied.

16. The actuator unit according to claim 15, wherein:
the first detection signal indicates the first relationship of the first physical quantity of the vibration that is in the direction perpendicular to the normal direction of the principal surface of the vibrated member, and the processing circuit is configured to estimate the force applied to the principal surface based on the first detection signal.

17. The actuator unit according to claim 16, further comprising:

a second sensor configured to generate a second detection signal that indicates a second relationship of a second physical quantity varying with time, the second physical quantity being related to a deformation amount of the principal surface of the vibrated member in the normal direction, wherein the processing circuit is configured to estimate the force applied to the principal surface based on the second detection signal.

18. The actuator unit according to claim 11, wherein the first sensor includes a piezoelectric body.

19. The actuator unit according to claim 11, wherein the actuator and the first sensor are a same member.

20. A tactile sense presentation device, comprising:

a vibrated member;

an actuator configured to cause a vibration by the vibrated member when a force is applied to the vibrated member;

a first sensor configured to generate a first detection signal indicating a first relationship of a first physical quantity varying with time, the first physical quantity being related to the vibration of the vibrated member, a variation cycle of the first physical quantity changing based on a magnitude of the force applied to the vibrated member; and a processing circuit configured to process the first detection signal, extract a parameter indicative of the variation cycle of the first physical quantity, and estimate the magnitude of the force applied to the vibrated member based on the parameter.

* * * * *